US012067632B2

(12) United States Patent
Madonna et al.

(10) Patent No.: US 12,067,632 B2
(45) Date of Patent: *Aug. 20, 2024

(54) DYNAMIC MANAGEMENT OF EV CAR CHARGING CRITICAL LOADS

(71) Applicant: Savant Systems, Inc., Hyannis, MA (US)

(72) Inventors: Robert P. Madonna, Osterville, MA (US); Siegmar K. Eschholz, Southwest Harbor, ME (US); Anna E. Demeo, Southwest Harbor, ME (US); William H. Dillon, Philomath, OR (US)

(73) Assignee: Savant Systems, Inc., Hyannis, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,868

(22) Filed: Oct. 11, 2022

(65) Prior Publication Data

US 2023/0033596 A1    Feb. 2, 2023

Related U.S. Application Data

(63) Continuation of application No. 15/966,798, filed on Apr. 30, 2018, now Pat. No. 11,494,852, which is a
(Continued)

(51) Int. Cl.
*F02P 7/00*        (2006.01)
*B60Q 1/14*       (2006.01)
(Continued)

(52) U.S. Cl.
CPC ........... *G06Q 50/06* (2013.01); *B60Q 1/1415* (2013.01); *F02P 7/00* (2013.01); *G06Q 30/0283* (2013.01);
(Continued)

(58) Field of Classification Search
CPC .. G06Q 50/06; G06Q 30/0283; B60Q 1/1415; F02P 7/00; H02J 3/008;
(Continued)

(56) References Cited

U.S. PATENT DOCUMENTS 4,001,646 A    1/1977  Howell
5,185,705 A    2/1993  Farrington
(Continued)

FOREIGN PATENT DOCUMENTS

CA      2353667 A1    2/2002
CN    102084569 A     6/2011
(Continued)

OTHER PUBLICATIONS

Demeo, Anna, et al. "Community smart grid utilizing dynamic demand response and tidal power for grid stabilization." Smart Grid and Renewable Energy 4.07 (2013): 465-472.
(Continued)

*Primary Examiner* — Renan Luque
(74) *Attorney, Agent, or Firm* — Cesari and McKenna, LLP

(57) ABSTRACT

A power controller configured to fit in a circuit breaker panel powering one or more loads. The power controller is further configured to manage critical loads of the one or more loads each controlled by a component that is capable of being actuated by the power controller and operated from a smartphone via the power controller, wherein the critical loads need not be wired to a dedicated circuit breaker panel.

20 Claims, 33 Drawing Sheets

Related U.S. Application Data continuation of application No. 15/706,145, filed on Sep. 15, 2017, now Pat. No. 10,956,992.

(60) Provisional application No. 62/406,481, filed on Oct. 11, 2016, provisional application No. 62/395,230, filed on Sep. 15, 2016.

(51) Int. Cl.
  *G06Q 30/0283* (2023.01)
  *G06Q 50/06* (2012.01)
  *H02J 3/00* (2006.01)
  *H02J 9/04* (2006.01)

(52) U.S. Cl.
  CPC ............. *H02J 3/008* (2013.01); *H02J 9/04* (2013.01); *H02J 2203/20* (2020.01); *H02J 2310/14* (2020.01); *H02J 2310/64* (2020.01); *Y02B 70/30* (2013.01); *Y04S 20/222* (2013.01); *Y04S 20/242* (2013.01); *Y04S 50/10* (2013.01); *Y04S 50/14* (2013.01); *Y10S 323/905* (2013.01)

(58) Field of Classification Search
  CPC ...... H02J 9/04; H02J 2203/20; H02J 2310/14; H02J 2310/64; H02J 2310/10; Y02B 70/30; Y02B 70/3225; Y04S 20/222; Y04S 20/242; Y04S 50/10; Y04S 50/14; Y04S 20/20; Y10S 323/905
  See application file for complete search history.

(56) References Cited

U.S. PATENT DOCUMENTS

| | | | |
|---|---|---|---|
| 7,043,380 | B2 | 5/2006 | Rodenberg, III |
| 9,300,141 | B2 | 3/2016 | Marhoefer |
| 2004/0007534 | A1 | 1/2004 | Liao et al. |
| 2004/0163073 | A1 | 8/2004 | Krzyzanowski et al. |
| 2005/0102544 | A1 | 5/2005 | Brewer |
| 2005/0216131 | A1 | 9/2005 | Sodemann et al. |
| 2007/0222295 | A1 | 9/2007 | Wareham et al. |
| 2008/0143305 | A1 | 6/2008 | Drugge et al. |
| 2010/0152910 | A1 | 6/2010 | Taft |
| 2010/0161146 | A1 | 6/2010 | Boss et al. |
| 2010/0314940 | A1 | 12/2010 | Palmer et al. |
| 2011/0210712 | A1 | 9/2011 | Tagare |
| 2011/0313587 | A1 | 12/2011 | Lin |
| 2012/0104847 | A1 | 5/2012 | Roscoe et al. |
| 2012/0239218 | A1 | 9/2012 | Forbes, Jr. |
| 2012/0265459 | A1 | 10/2012 | Sfaelos et al. |
| 2012/0324271 | A1 | 12/2012 | Nigam |
| 2012/0330473 | A1 | 12/2012 | Meredith et al. |
| 2014/0067144 | A1 | 3/2014 | Chen et al. |
| 2014/0088780 | A1* | 3/2014 | Chen ................ H02J 13/00004 700/295 |
| 2014/0139023 | A1 | 5/2014 | Hwang et al. |
| 2014/0277800 | A1 | 9/2014 | Hughes |
| 2014/0336837 | A1 | 11/2014 | Kiuchi et al. |
| 2014/0379161 | A1 | 12/2014 | Busser |
| 2015/0012145 | A1 | 1/2015 | Kiko |
| 2015/0042286 | A1 | 2/2015 | Lu et al. |
| 2015/0214759 | A1 | 7/2015 | Wootton |
| 2015/0214768 | A1 | 7/2015 | Matsuyama et al. |
| 2015/0256665 | A1 | 9/2015 | Pera et al. |
| 2015/0276253 | A1 | 10/2015 | Montalvo |
| 2015/0280436 | A1 | 10/2015 | Weckx et al. |
| 2016/0226235 | A1* | 8/2016 | Lathrop .................... H02J 4/00 |
| 2016/0350778 | A1 | 12/2016 | Levine et al. |
| 2016/0358722 | A1 | 12/2016 | Lakshmanan et al. |
| 2016/0363949 | A1 | 12/2016 | Zimmanck |
| 2017/0140602 | A1 | 5/2017 | Curt |
| 2017/0236676 | A1 | 8/2017 | Bartonek |
| 2017/0288599 | A1 | 10/2017 | Chapman |
| 2017/0344045 | A1 | 11/2017 | Forbes, Jr. |
| 2018/0075548 | A1 | 3/2018 | Madonna |
| 2018/0082816 | A1 | 3/2018 | Herrmann |
| 2018/0299160 | A1 | 10/2018 | Inuga et al. |
| 2018/0342870 | A1 | 11/2018 | Zeng et al. |
| 2019/0261493 | A1 | 8/2019 | Dolan et al. |

FOREIGN PATENT DOCUMENTS

| | | |
|---|---|---|
| CN | 102323472 A | 1/2012 |
| CN | 202939450 U | 5/2013 |
| CN | 103326381 A | 9/2013 |
| CN | 204230176 U | 3/2015 |
| CN | 104537505 A | 4/2015 |
| CN | 105848389 A | 8/2016 |
| JP | 2002-95152 A | 3/2002 |
| JP | 2002320327 A | 10/2002 |
| JP | 2003092844 A | 3/2003 |
| JP | 2003-111311 A | 4/2003 |
| JP | 2005110218 A | 4/2005 |
| JP | 2007510394 A | 4/2007 |
| JP | 2007236023 A | 9/2007 |
| JP | 2008310972 A | 12/2008 |
| JP | 2010531129 A | 9/2010 |
| JP | 2010-537622 A | 12/2010 |
| JP | 2011-120323 A | 6/2011 |
| JP | 201222706 A | 2/2012 |
| JP | 2012-511300 A | 5/2012 |
| JP | 2012-514963 A | 6/2012 |
| JP | 2012-235615 A | 11/2012 |
| JP | 2013115885 A | 6/2013 |
| JP | 2014-03726 A | 1/2014 |
| JP | 2014036465 A | 2/2014 |
| JP | 2014108003 A | 6/2014 |
| JP | 2014165998 A | 9/2014 |
| JP | 2015-215879 A | 12/2015 |
| JP | 2016100917 A | 5/2016 |
| JP | 2016-134939 A | 7/2016 |
| JP | 2016-158479 A | 9/2016 |
| JP | 2016226141 A | 12/2016 |
| JP | 2017511098 A | 4/2017 |
| JP | 2017216789 A | 12/2017 |
| JP | 2009-507340 A | 2/2024 |
| KR | 1014404920000 | 9/2014 |
| WO | WO-2004023624 A1 | 3/2004 |
| WO | WO-2005065148 A2 | 7/2005 |
| WO | WO-2007027063 A1 | 3/2007 |
| WO | WO-2010065197 A2 | 6/2010 |
| WO | WO-2011073020 A2 | 6/2011 |
| WO | WO-2015094518 A1 | 6/2015 |
| WO | WO-2015134987 A1 | 9/2015 |
| WO | WO-201609492 A1 | 1/2016 |
| WO | WO-2016036419 A1 | 3/2016 |

OTHER PUBLICATIONS

EP Office Action mailed Jun. 7, 21, EP Application No. 17 777 715.8-1202, 4 pages.

Husen et al. "Lighting Systems Control for Demand Response," IEEE 2011, 6 pages.

Kempton, Willett et al. "Vehicle-to-grid power implementation: From stabilizing the grid to supporting large-scale renewable energy." Journal of power sources 144.1 (2005): 280-294.

PCT Invitation to Pay Additional Fees and, Where Applicable, Protest Fee, International Application No. PCT/US2017/051808, mailed Dec. 1, 2017, 14 pages.

PCT Notification of Transmittal of the International Search Report and the Written Opinion of the International Searching Authority, or the Declaration, International Searching Authority, International Application No. PCT/US2017/051808, mailed May 14, 2018, 24 pages.

Park, Sung Min. "Control and Integration Strategies for Bidirectional and Unidirectional Converters in Residential Distributed Power Systems." (2015).

(56) References Cited

OTHER PUBLICATIONS

Xu, et al. "A generic user interface for energy management in smart homes." *Energy Informatics* 1 (2018): 1-63.

* cited by examiner

SINE WAVE DIMMING

TRADITIONAL CUT PHASE DIMMING:

DYNAMIC MANAGEMENT OF EV CAR CHARGING CRITICAL LOADS

CROSS-REFERENCE TO RELATED APPLICATIONS

The present application is a continuation of U.S. patent application Ser. No. 15/966,798, entitled DYNAMIC MANAGEMENT OF CRITICAL LOADS, filed on Apr. 30, 2018 by Robert P. Madonna et al., and issued on Nov. 8, 2022 as U.S. Pat. No. 11,494,852, which is a continuation of U.S. patent application Ser. No. 15/706,145, entitled SYSTEM AND METHODS FOR CREATING DYNAMIC NANO GRIDS AND FOR AGGREGATING ELECTRIC POWER CONSUMERS TO PARTICIPATE IN ENERGY MARKETS, filed on Sep. 15, 2017 by Robert P. Madonna et al., and issued on Mar. 23, 2021 as U.S. Pat. No. 10,956,992, which application claims priority from commonly owned Provisional Patent Application No. 62/395,230, entitled SYSTEM AND METHODS FOR CREATING DYNAMIC NANO GRIDS AND FOR AGGREGATING ELECTRIC POWER CONSUMERS TO PARTICIPATE IN ENERGY MARKETS, filed on Sep. 15, 2016 and from commonly owned Provisional Patent Application No. 62/406,481, entitled SYSTEM AND METHODS FOR CREATING DYNAMIC NANO GRIDS AND FOR AGGREGATING ELECTRIC POWER CONSUMERS TO PARTICIPATE IN ENERGY MARKETS, filed on Oct. 11, 2016 which applications are hereby incorporated by reference.

BACKGROUND OF THE INVENTION

Field of the Invention

The present invention relates generally to the field of electric power management and, more specifically, to a system and methods for managing an aggregation of electric power consumers to participate in energy markets.

Background Information

In the United States, electric power utility companies are highly regulated by both federal and state governments. In general, the retail rates charged by such companies for the power they supply are not set by an open market. Instead, the retail rates are set by a commission or other regulatory tribunal through a formal, administrative process which takes into account present and predicted future demand, costs incurred to build or gain access to new sources of supply, and a variety of other factors. Wholesale rates are often based on the independent system operator (ISO) market, but not in all areas.

Within the regulated market for electric power, there are power generating facilities known as "base load power plants," "load following power plants" and "peaking power plants." Base load power plants are typically large, lower cost facilities which operate continuously to meet the base demand for power in a given service area. Load following power plants, as the name implies, are generally intended to operate when demand (loads) are high, but limit or curtail operation when demand is low. Peaking is power plants, which often is used to refer to 10 minute and 30 minute reserves which are part of the ancillary services market, are generally intended to operate only intermittently to meet peak demand in the service area, or to meet demand in the event of a contingency such as a power plant failure. Thus, the need for a peaking power plant to actually operate may arise on only a few days each year and may last for only a few hours.

To participate in energy markets, a facility is by regulation required to generate a minimum output power level (e.g., 100 kW), be capable of bringing that power online within a predetermined time period following a request from a grid operator, and remain online for a predetermined minimum time period. In accordance with prevailing regulations, peaking power plants are paid a premium rate for the power they supply. This is justifiable given the extremely intermittent operation of such plants, the state of readiness that they must maintain, and the importance of ensuring that peak demand is satisfied without interruption.

Recently, a court considered the question of whether, under prevailing regulations, a market participant could consist of a facility which reduces electrical loads in a given service area, thereby reducing power consumption as opposed to generating additional power. The court answered the question in the affirmative, thus creating an opportunity to develop new facilities which are eligible to participate in all of the established energy markets including, but not limited to, ancillary services (10 and 30 minute reserves, frequency control, and regulation), real-time market, day-ahead market, and forward capacity market, but which operate on a model of reduced consumption and not increased production.

Another problem of interest manifests in solar (photovoltaic or pv) panel-equipped homes, businesses or other premises. The vast majority of such installations are grid-tie systems, which means that excess power generated by the solar pv panels is sent back to the power grid, and any additional power needed by the premises is supplied by the grid. Because of anti-islanding laws, all grid-tie systems no longer operate when the power grid goes down, even though the solar pv panels could be generating power that could be used on the premises. In recent years, islanding inverters have made it possible to continue using solar pv panels while still complying with anti-islanding laws. These is secondary inverters work in conjunction with batteries and a critical load panel to supply homes, businesses or premises with limited power to critical loads. However, the critical loads are "fixed" because they must be selected in advance and wired into the critical load panel which is separate from the main circuit breaker panel.

SUMMARY OF THE INVENTION

In accordance with one aspect of the invention, a group of homes, businesses, or other electric power consuming premises are aggregated and commonly controlled to dynamically reduce loads in sufficient quantities, and with sufficient rapidity and duration, to participate as a market participant in the energy markets including participating as a peaking power plant. While the amount of reduced power consumption for a single premises is typically quite small, the total reduced consumption of an aggregation of just a few thousand homes or businesses may be on the order of hundreds of kilowatts. By electing to participate in the aggregation, each home, business or other premises contributes to a substantial, ongoing conservation effort, and may share in the revenue which is received from the provider. Similarly, when power costs are low, loads inactive during peak periods may be activated saving cost over operating those loads during the peak period.

Each home, business or other premises which participates in the aggregation is provided with a premises power controller and intelligent circuit breakers which augment conventional circuit breakers or fuses. The premises power controller and intelligent circuit breakers may be installed during construction or as a retrofit. The premises power controller may include a processor, memory, a display which may function to provide a user interface, interfaces for the intelligent circuit breakers, major appliances, heating, ventilating and air conditioning (HVAC) systems, water heaters, as well as interfaces for solar, geothermal, micro-hydro, or wind generation and inverters, storage batteries, generators, other renewable power sources, home automation systems, schedulers or user control devices. The premises power controller may also include interfaces for environmental sensors (e.g., temperature, barometric pressure, voltage, current, motion is detectors) and other sensors of interest. The premises power controller may also include wide area network (WAN) connectivity or other suitable network connectivity for communicating with an aggregation server or other systems that may be remotely located.

Each intelligent circuit breaker is electrically capable of being actuated and interfaces with a conventional circuit breaker which is manually capable of being actuated. Each intelligent circuit breaker includes a power meter, a wireless transceiver for communicating with other intelligent circuit breakers and the premises power controller, a breaker controller, memory, and a display. For lighting circuits, the intelligent circuit breaker also includes a dimmer. The memory may be used to temporarily store data of interest regarding the intelligent circuit breaker's status, power consumption, operating history, and the like. The intelligent circuit breakers may advantageously be constructed in a form factor which is compatible with (i.e., adapted to fit) circuit breaker panels offered by major manufacturers of electrical equipment (e.g., Square D by Schneider Electric, General Electric Company, Siemens AG, Murray by Siemens AG, Thomas & Betts of ASEA Brown Boveri, and Crouse-Hinds by Eaton).

Because the intelligent circuit breakers are normally installed inside a metal breaker panel, there is typically considerable interference with wireless communication to and from the breakers. To overcome such interference, a wireless mesh network may be established among the wireless transceivers that are associated with the intelligent circuit breakers. The wireless mesh network enables messages received by a designated gatekeeper wireless transceiver to propagate across all of the other wireless transceivers while reducing congestion in communication with the premises power controller. The gatekeeper wireless transceiver is responsible for transmitting messages originating from any of the other wireless transceivers to the premises power controller, as well as relaying messages received from the premises power controller to one or more of the other wireless transceivers. To further reduce interference, the gatekeeper wireless transceiver may be located in proximity to an aperture in the breaker panel. The aperture alone, or possibly in combination with wire runs which pass through the aperture, may enable satisfactory wireless communication between the gatekeeper wireless transceiver and is premises power controller. Alternatively, the aperture may accommodate a small antenna which is coupled to the gatekeeper wireless transceiver.

Through its own wireless transceiver, wireless mesh network, and gatekeeper wireless transceiver, each intelligent circuit breaker may send messages to the premises power controller. Such messages may report the amount of power being consumed instantaneously, the average power consumed over a given time period, a change in the amount of power consumed, status information, or other data of interest. Such data may be temporarily stored by the premises power controller before it is passed along to the aggregation server or other system.

Each intelligent circuit breaker may also receive messages from the premises power controller. One type of message causes the circuit breaker to actuate, thereby opening the circuit and disconnecting the associated load, or closing the circuit and connecting the load to a line (power grid) source, a renewable power source, backup generator, or an energy storage device, such as a differential pressure cell, an electro-chemical battery, and a chemical energy storage system (hereinafter after battery) on the premises. Thus, one advantage provided by the present invention is that critical loads within the premises need not be wired to a separate, dedicated circuit breaker panel in order to maintain power to those loads when the power grid is down.

A premises may also include an AC-DC converter whose output is coupled to a DC-AC inverter with power factor control, which in turn is coupled to dimmable loads. The output (DC) of the converter is coupled to the inverter, at which a power factor may be altered in conjunction with an inversion to AC. The altered power factor causes a reduction of the amount of real power absorbed by the dimmable loads, thereby providing further improvement to overall efficiency as well as contributing to a reduction in consumption as part of an aggregation's performance as a market participant.

Another advantage provided by the present invention is that when the power grid is up and a renewable source is generating "surplus" power on the premises, the intelligent circuit breakers may be dynamically managed to connect additional loads (e.g., charge available batteries and electric vehicles first, followed by a swimming pool heater, auxiliary water heater, and the like) to consume the available "surplus" power as opposed is to selling such power to the utility company, if possible and advantageous given the prevailing circumstances.

Yet another advantage provided by the present invention is that each individual load may be dynamically managed by the premises power controller to both improve overall efficiency of the premises, and enable the premises to function as part of an aggregation that participates in the energy markets.

Yet another advantage provided by the present invention is that user-oriented functions such as lighting control, including dimming, may be performed without the need for separate, conventional lighting control equipment.

Yet another advantage provided by the present invention is that a premises, when dynamically managed by a premises power controller in conjunction with intelligent circuit breakers, maintains a higher level of functionality and acts as its own nano-grid when the power grid is down. Conversely, when the power grid is up, the present invention may capitalize on time-of-use pricing by managing loads based on need and pricing structure.

In general, each premises power controller is programmed to dynamically manage power consumption within the premises in accordance with a plurality of predetermined scenarios. Such power management scenarios may include, for example, a "normal" scenario when the power grid is up, an "emergency" scenario when the power grid is down, a "renewable favorable" scenario when environmental conditions are favorable for a renewable power source that is associated with the premises, a "renewable unfavorable" scenario when environmental conditions are unfavorable for a renewable power source, and a "market trading" scenario when the premises must function within an aggregation that is participating in the independent system operator market including providing ancillary services (e.g., performing as a peaking power plant), and the like.

When a regional grid controller or other authority signals the aggregation server that a market participant is needed to meet demand, the aggregation server uses the WAN to direct the premises power controllers within the aggregation to initiate their "market trading" or similar power management scenarios. In response, each premises power controller, subject to an overriding command issued by the premises owner or other authority, proceeds to dynamically disconnect individual loads by sending appropriate messages wirelessly to the intelligent circuit breakers. The disconnected loads may remain disconnected for the entire time that the aggregation is functioning as a market participant or, alternatively, may be reconnected by an authorized override. Once the aggregation server receives a signal that the aggregation no longer needs to function as a market participant, the server issues a message to the premises power controllers directing them to resume their "normal" power management scenarios or another appropriate scenario.

The premises power controller may also issue notifications to users regarding power management-related events. For example, if the premises is equipped with solar panels and the premises power controller receives a weather forecast for sunshine, a notification may be sent to a user's email address, mobile phone, or other device to remind the user to plug in an electric vehicle to charge, turn on an auxiliary water heater, or take other action to fully use the power which is expected to be generated by the solar panels. Additionally, during periods of abnormally high energy costs, or very low expected production, notifications may be issued to users reminding them to take measures to limit use, such as ensuring that windows and doors are closed, lighting demands are reduced, or other loads are minimized.

BRIEF DESCRIPTION OF THE DRAWINGS

The invention description below refers to the accompanying drawings, of which.

DETAILED DESCRIPTION OF ILLUSTRATIVE EMBODIMENTS

Figure 1:
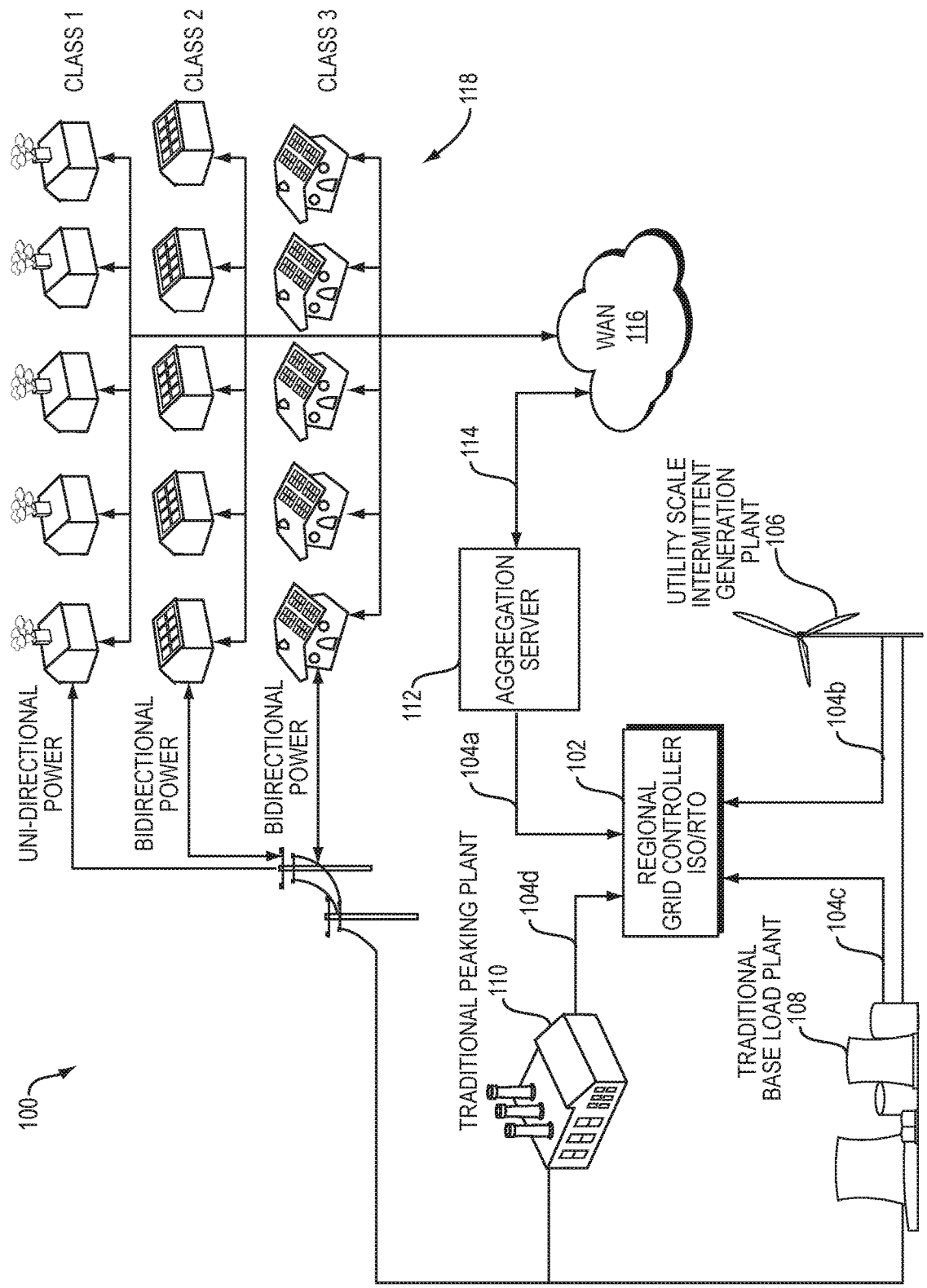
FIG. 1 is a schematic diagram of a power grid in which a group of power consuming premises are aggregated and commonly managed to participate in energy markets in accordance with one aspect of the present invention.

FIG. 1 shows a portion of a power grid 100 which includes a regional grid controller 102 associated with an independent system operator (ISO) or regional transmission organization (RTO). Regional grid controller 102 has a bidirectional communication link 104 with each of a utility scale intermittent generation (wind turbine) plant 106, a traditional base load (nuclear) plant 108, a traditional peaking (gas turbine) plant 110, and an aggregation server 112. Aggregation server 112 has a bidirectional communication 114 with a wide area network (WAN) 116 which, in turn, has bidirectional communication with each premises that is part of an aggregation 118.

The premises which form aggregation 118 may be classified in one of three classes. Class 1 premises are those which do not include any solar or other renewable is source of power (collectively, "renewable source") nor any battery capable of storing a significant amount of power, but may include a backup generator which may serve to power some or all of the premises when power grid 100 is unavailable. When power gird 100 is available, Class 1 premises normally only draw power (unidirectionally) from power grid 100.

Class 2 premises are those which include at least one renewable source and possibly a backup generator, but do not include a battery of significant capacity. Class 2 premises draw power from power grid 100 when the renewable source is offline or insufficient to meet the demand of the premises, but may deliver power to power grid 100 when there is a surplus. Thus, Class 2 premises are characterized by bidirectional power flow.

Class 3 premises are those which include at least one renewable source as well as one or more batteries of significant capacity, and possibly a backup generator. Like Class 2 premises, Class 3 premises may draw power from or deliver power to power grid 100 depending upon environmental conditions, the demand of the premises and other factors. As described in detail below, aggregation 118, which represents a mix of Class 1, 2 and 3 premises, may be managed as single entity which performs as an energy market participant based on a model of reduced consumption of power possibly in combination with production from battery storage.

Figure 2:
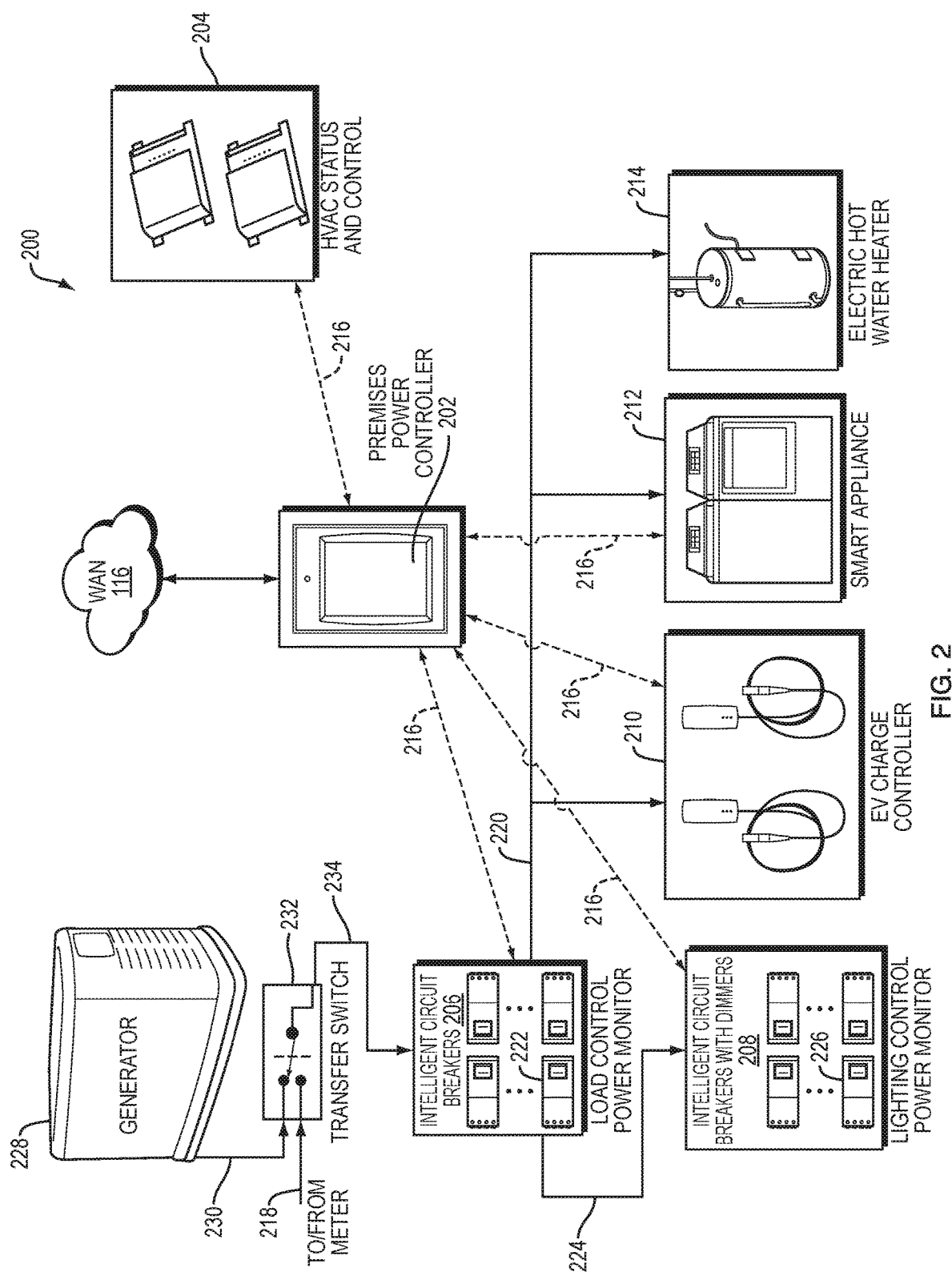
FIG. 2 is a schematic diagram of an electric power control system for the Class 1 premises shown in FIG. 1.

FIG. 2 shows a Class 1 premises 200 which may represent, for example, a single family home which does not include any renewable source or battery of significant capacity, but may include a backup generator 228. For improved clarity and consistency, an element which was introduced earlier, such as WAN 116, shall retain the previously assigned reference number throughout this specification unless otherwise noted. A premises power controller 202 communicates over wireless links 216 with energy control modules such as, HVAC status and control modules (thermostat) 204, a circuit breaker panel 206 populated with intelligent circuit breakers 222, a sub-panel 208 populated with intelligent circuit breakers which include dimmers 226, an electric vehicle (EV) charge controller 210, and a smart appliance 212. Load conductors 220 connect individual intelligent circuit breakers 222 with EV charge controller 210, smart appliance 212, electric water heater 214, and other non-lighting loads (not shown). Conductors 224 connect lighting (not shown), via panel 206, to individual intelligent circuit breakers with dimmers 226 located within sub-panel 208.

Wireless communication links 216 may be implemented with Bluetooth®, Wi-Fi, or any of a number of other commercially available wireless technologies. Such wireless communication links greatly reduce the cost of and time required for installation of premises power controller 202. Alternatively, if the design of or materials used in a particular premises is not conducive to wireless communication, wired communication links (e.g., Ethernet) may be used by the addition of appropriate interfaces on premises power controller 202 as well as the other devices shown in FIG. 2.

Backup generator 228 is coupled to a transfer switch 232 by a conductor 230. Transfer switch 232 is coupled by a conductor 234 to circuit breaker panel 206. Transfer switch 232 is also coupled to a utility company meter (not shown) by a conductor 218. When power grid 100 is down, transfer switch 232 moves to the position shown in FIG. 2, which enables backup generator 228 to supply power to critical loads which are managed by premises power controller 202 as described below. Here again, non-critical loads may be advantageously disconnected under the direction of premises power controller 202 while power grid 100 remains down.

In general, premises power controller 202 is responsible for managing power consumption in premises 200. Among other features and capabilities, premises power controller 202 is responsible for dynamically actuating individual intelligent circuit breakers 222, 226 to disconnect individual loads, thereby reducing power consumption of premises 200 and contributing to an aggregation which is performing as an energy market participant. As described in detail below, more than one premises power controller 202 may be present in a given premises for purposes of redundancy, load sharing, or the like.

Figure 3:
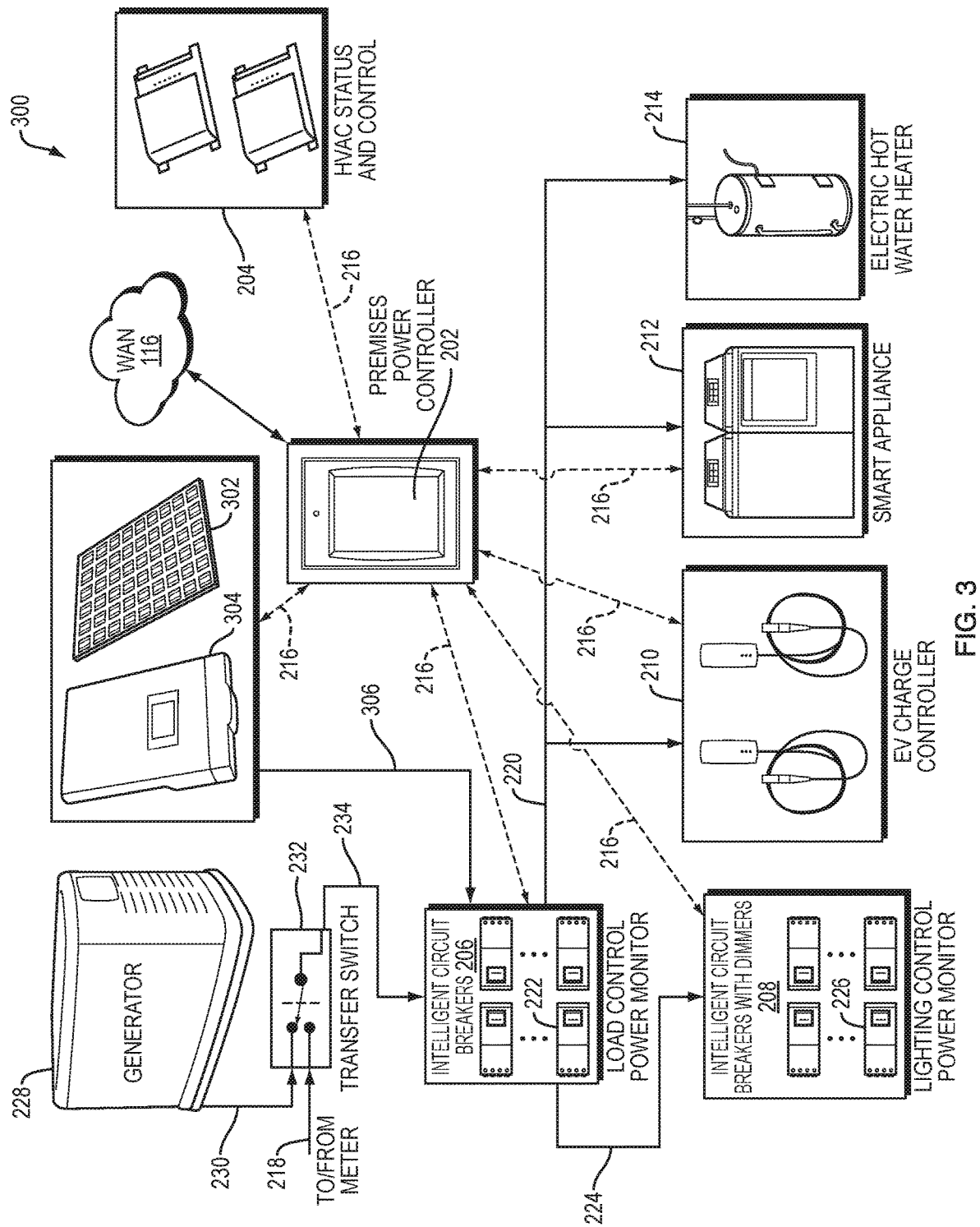
FIG. 3 is a schematic diagram of an electric power control system for the Class 2 premises shown in FIG. 1.

FIG. 3 shows a Class 2 premises 300 which may represent, for example, a single family home which includes a solar panel array (renewable source) 302 and inverter 304, and backup generator 228, but does not include a battery of significant capacity. Inverter 304 is coupled to circuit breaker panel 206 by a conductor 306. In addition to converting DC to AC, inverter 304 may include an internal disconnect which functions to isolate renewable source 302 when power grid 100 (FIG. 1) is down and backup generator 228 is active. Alternatively, a separate disconnect (not shown) may be provided between inverter 304 and circuit breaker panel 206.

All other elements are substantially similar to those shown in FIG. 2 with two notable exceptions. First, given the presence of renewable source 302, premises 300 may under favorable environmental conditions generate more power than it consumes, in which case excess power may be delivered, via the utility company meter (not shown), to power grid 100. Second, the programming of premises power controller 202, as described in detail below, must account for renewable source 302 and inverter 304.

Figure 4:
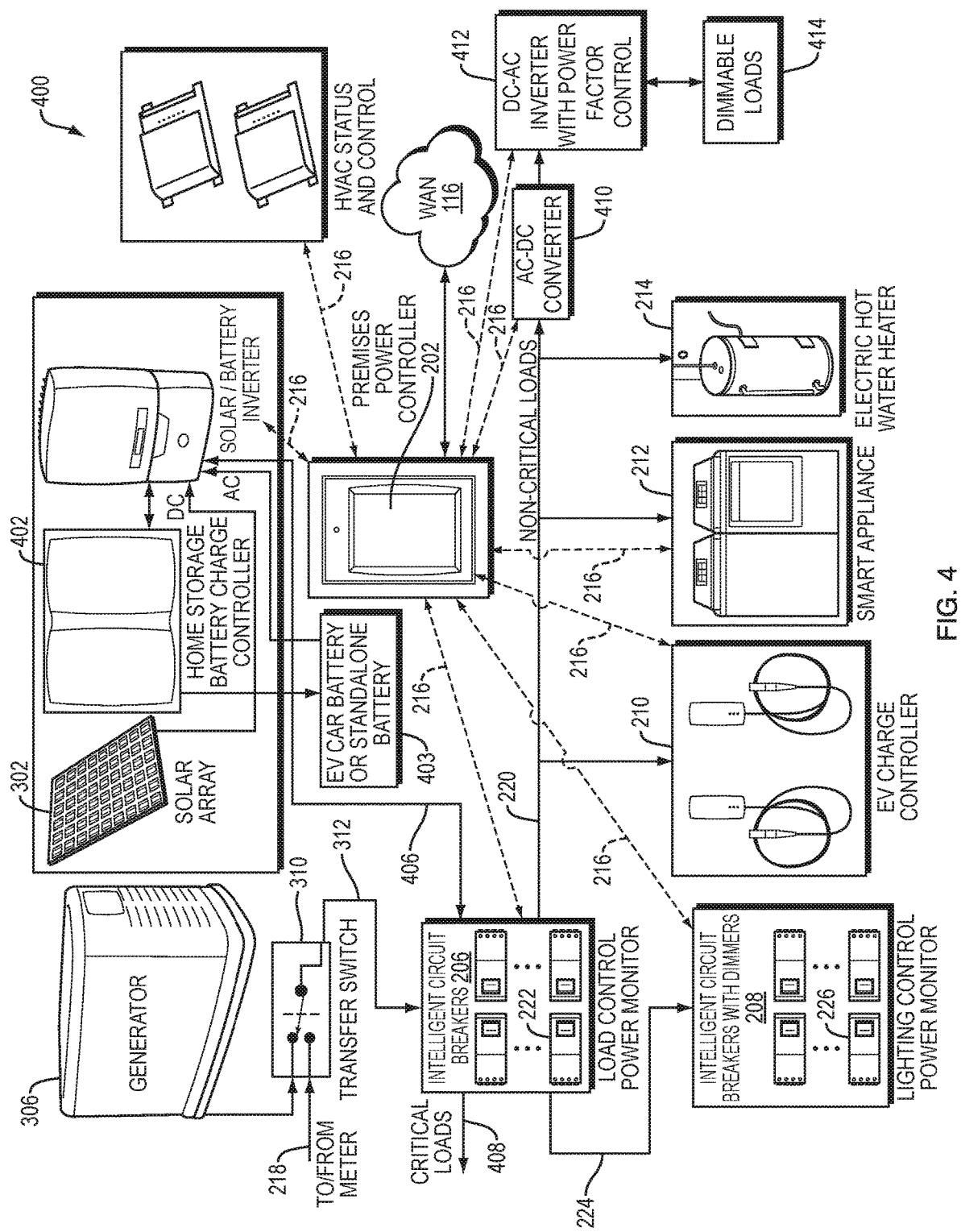
FIG. 4 is a schematic diagram of an electric power control system for the Class 3 premises shown in FIG. 1.

FIG. 4 shows a Class 3 premises 400 in which a renewable source 302 is present along with a storage battery/charge controller 402, an EV car battery/standalone battery 403, and a solar/battery inverter 404. Storage battery/charge controller 402 is coupled to and charges car battery/standalone battery 403, which in turn is coupled to inverter 404. Inverter 404 functions to convert DC output by renewable source 302 or car battery/standalone battery 403 to AC which is supplied by conductor 406 to panel 206.

Transfer switch 232 operates to disconnect panel 206 from power grid 100 (FIG. 1) when power grid 100 is down, which enables renewable source 302, storage battery charge controller 402, and inverter 404 (or, alternatively, backup generator 228) to supply power to critical loads connected by conductors 408 to specific intelligent circuit breakers 222. Conversely, to conserve power while power grid 100 is down, non-critical loads, such as EV charge controller 210, smart appliance 212, and electric water heater 214, may be disconnected by actuating their respective intelligent circuit breakers 222 in response to one or more messages received from premises power controller 202.

Also shown is an AC-DC converter 410 whose output is coupled to a DC-AC inverter with power factor control 412, which in turn is coupled to dimmable loads 414. AC-DC converter 410 and DC-AC inverter with power factor control 412 communicate with premises power controller 202 through wireless communication links 216. As described in detail below, converter 410, in combination with inverter 412, may be used to advantageously alter the power factor so as to reduce the amount of real power absorbed by dimmable loads 414.

Figure 5:
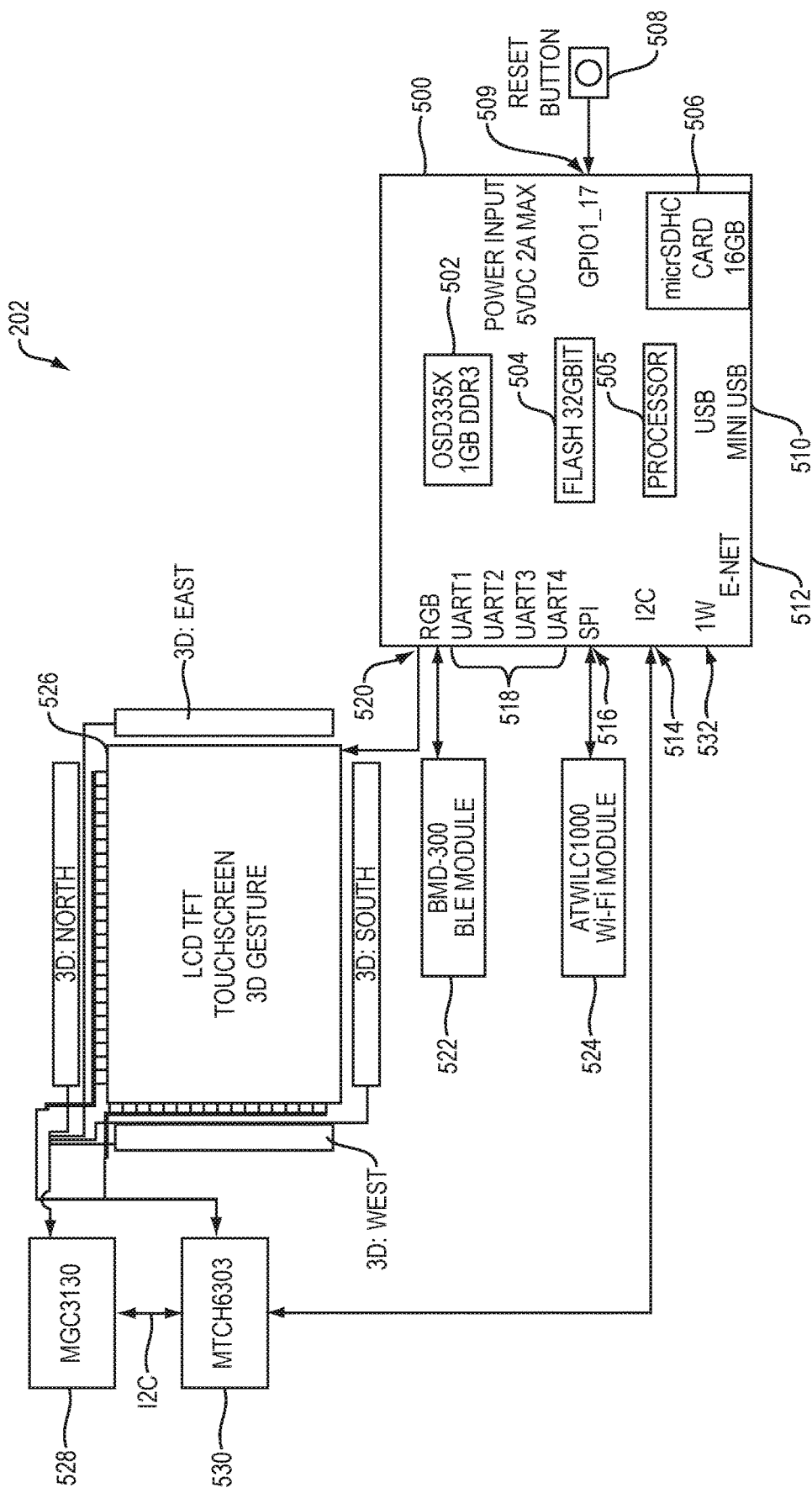
FIG. 5 is a block diagram of the premises power controller shown in FIGS. 2, 3, 4A and 4B.

FIG. 5 is a block diagram of premises power controller 202. A controller board 500, which may be based on a commodity embedded system, includes 1 GB of double data rate memory 502, 32 GB of flash memory 504, a processor 505, and a 16 GB microSDHC card 506. A reset button 508 is coupled to a GPIO interface 509. Controller board 500 also includes a USB/mini USB interface 510, an Ethernet interface 512, an I2C interface 514, a 1-Wire interface 532, an SPI interface 516 which is coupled to a Wi-Fi module 524, four UART interfaces 518 (one of which is coupled to a Bluetooth® module 522), and an RGB interface 520 which is coupled to an LCD TFT touchscreen 526. A three-dimensional tracking and gesture controller 528 is coupled to touchscreen 526 and a projected capacitive touch controller 530, which in turn is coupled to I2C interface 514.

As described above in connection with FIGS. 2, 3, and 4, premises power controller 202 may wirelessly communicate with intelligent circuit breakers 222 and other devices within a given premises using Wi-Fi module 524 or Bluetooth® module 522. Touchscreen 526 may be used to display on screen icons, buttons, controls, messages, status information, menus or other desired user interface elements (not shown) to enable a user to configure and operate premises power controller 202. For example, touchscreen 526 may be used to: create, modify, or select a power management scenario; create, modify, or select a schedule; obtain status information regarding various system components; connect or disconnect individual intelligent circuit breakers; override or disable the current operation of premises power controller 202; and otherwise configure, modify, and operate premises power controller 202. Alternatively, a user may wirelessly operate premises power controller 202 using a smartphone, tablet, or other device which includes appropriate application and wireless network connectivity. In addition, premises power controller 202 may be integrated with and controlled by a home automation system.

Figure 6A:
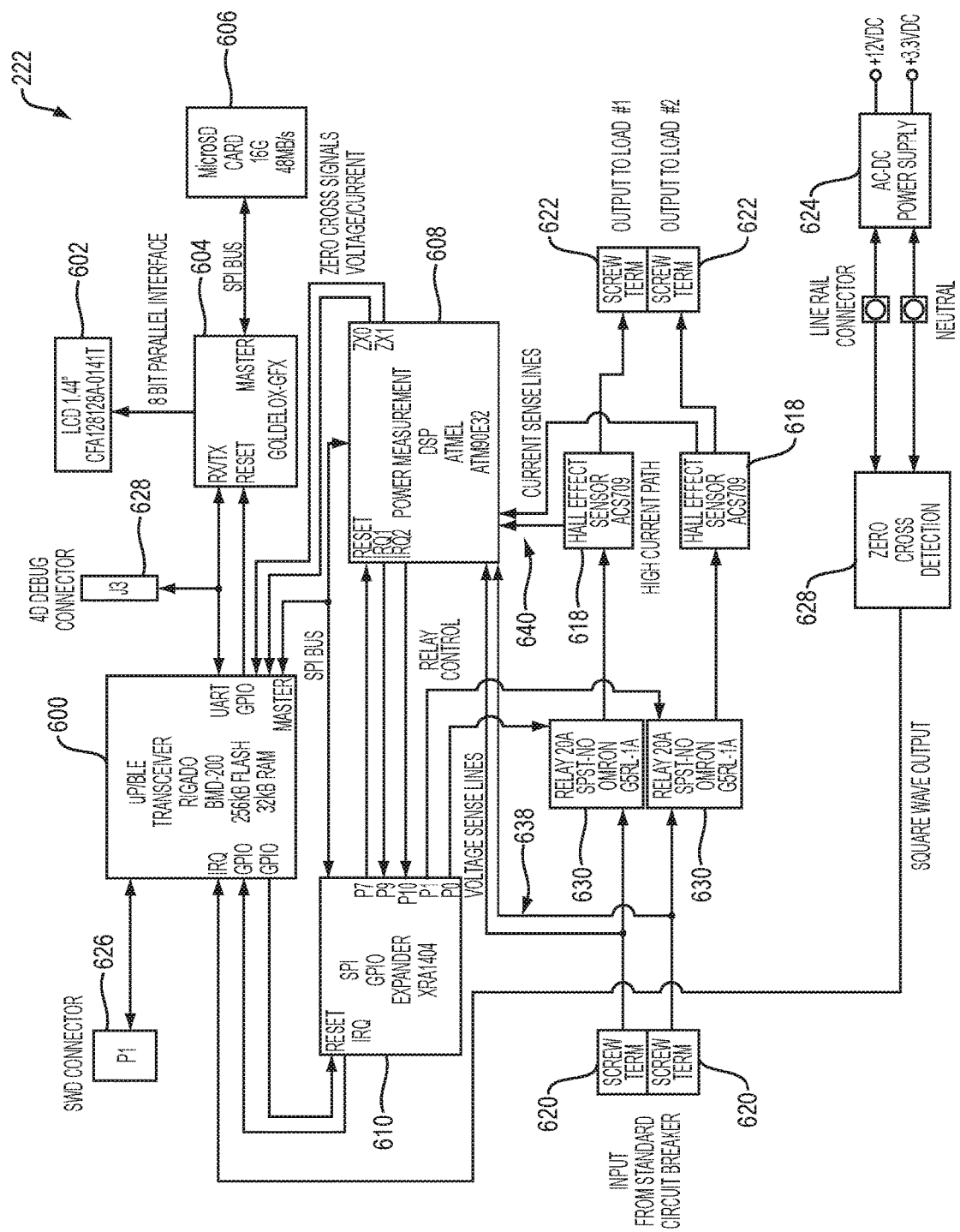
FIG. 6A is a block diagram of an intelligent circuit breaker for two 15 A/120 VAC circuits.

FIG. 6A is a block diagram of an intelligent circuit breaker 222 as shown in FIGS. 2, 3, and 4. As shown, intelligent circuit breaker 222 supports two 15 A/120 VAC circuits. A processor with onboard Bluetooth® transceiver serves as a breaker controller 600. Breaker controller 600 may be implemented with a Rigado BMD-200 module or similar is commercially available component. Breaker controller 600 is coupled to a serial wire debug (SWD) connector 626, a 4D debug connector 628, a GPIO expander 610, an embedded graphics controller 604, and a power measurement digital signal processor (DSP) 608. Power measurement DSP 608 is also coupled to voltage sense lines 638 and current sense lines 640.

An LCD 602 and a 16 GB microSD card are coupled to embedded graphics controller 604. A pair of relays 630 is coupled, respectively, between a pair of screw terminals 620 and a pair of Hall Effect sensors 618. Each of a pair of screw terminals 620 serves as a connection point to a conventional 15 A/120 VAC circuit breaker (not shown), such as an arc fault breaker, which is manually capable of being actuated. In the alternative, the relays may be embodied as an actuated mechanical switch to obviate the need of the conventional circuit breaker while providing for adequate safety. Each of a pair of screw terminals 622 serves as a connection point to a desired load (not shown). An AC-to-DC power supply 624 outputs +12 VDC and +3.3 VDC to power intelligent circuit breaker 226. As an alternative to using power measurement DSP 608 to output pulses when the sensed voltage and current are near zero, a zero cross detection circuit 628 may be used to generate a square wave output signal which is coupled to breaker controller 600.

Breaker controller 600, using its onboard Bluetooth® connectivity, communicates with other breaker controllers to establish a wireless mesh network among all of the breaker controllers. The presence of a mesh network advantageously enables a single breaker controller within a breaker panel or, alternatively, a designated gatekeeper transceiver, to conduct communications with a premises power controller (FIG. 2), and propagate such communications to all other breaker controllers. Alternatively, a wireless mesh network may be established using Zigbee, Z-wave or other suitable technologies.

LCD 602 may be used to display a variety of information (e.g., the current state of the circuit breaker, a configuration of the circuit breaker, instantaneous power consumption, identifier, such as a zone, of the circuit breaker, and diagnostic codes). MicroSD card 606 may be used to store power consumption data and other data of interest until a scheduled time when such data is forward to a premises power controller 202 or discarded as stale.

Power measurement DSP 608 is capable of calculating, among other values, instantaneous power consumption separately for each load connected to screw terminals 622, as well as average power consumption over a specified period of time, and peak power consumption. Power measurement DSP 608 may also be configured to output pulses (on dedicated pins ZX0, ZX1, which are coupled to breaker controller 600) when the current and voltage are near zero.

By knowing when zero crossings of current and voltage are occurring, breaker controller 600 ensures that relays 630 are only switched (i.e., intelligent circuit breaker 222 is opened or closed) contemporaneously with the occurrence of a zero crossing. This advantageously reduces arcing and tends to prolong the service lives of relays 630.

An intelligent circuit breaker suitable for a single 30 A/220 VAC circuit may be implemented using the components shown in FIG. 6A, except for substituting a Rigado BMD-300 module for breaker controller 600.

Figure 6B:
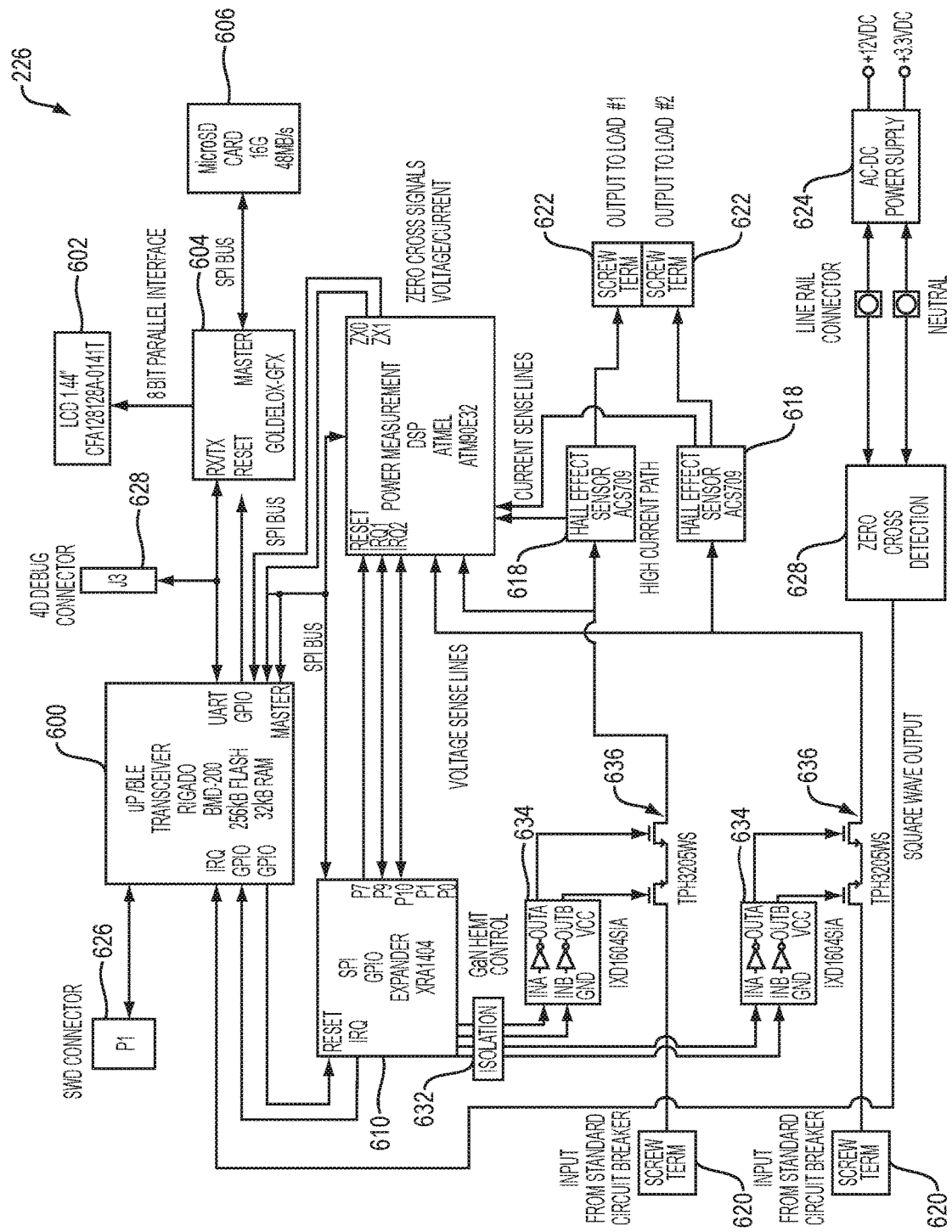
FIG. 6B is a block diagram of an intelligent circuit breaker for two 15 A/120 VAC circuits which includes two dimmer circuits.

FIG. 6B is a block diagram of an intelligent circuit breaker with dimmers 226 as shown in FIGS. 2, 3, and 4. Most of the components are the same as those shown in FIG. 6A. However, instead of relays 630, intelligent circuit breaker with dimmers 226 includes an isolation circuit 632 which is coupled between GPIO expander 610 and two pairs of gallium nitride high electron mobility (GaN HEMT) transistors 636 which, with their respective controls 634, function as dimmers. Each pair of transistors 636 is coupled to power measurement DSP 608 as well as one of Hall Effect sensors 618. Conventional dimmers utilize silicon-based field effect transistors (FETs) or TRIACs, both of which have a higher on resistance ($R_{on}$) than GaN HEMT components. Thus, conventional dimmers must dissipate more heat for a given amount of current, which is problematic and potentially unsafe in a circuit breaker panel with tightly packed components. In order to effectively dissipate heat, conventional dimmers require large heat sinks that do not fit well or at all in conventional breaker panels. By using GaN HEMT components for the dimmers, significant reduction in heat dissipation is advantageously achieved without the need for bulky heat sinks, thereby enabling more circuits to be safely packed in a given area.

Figure 6C:
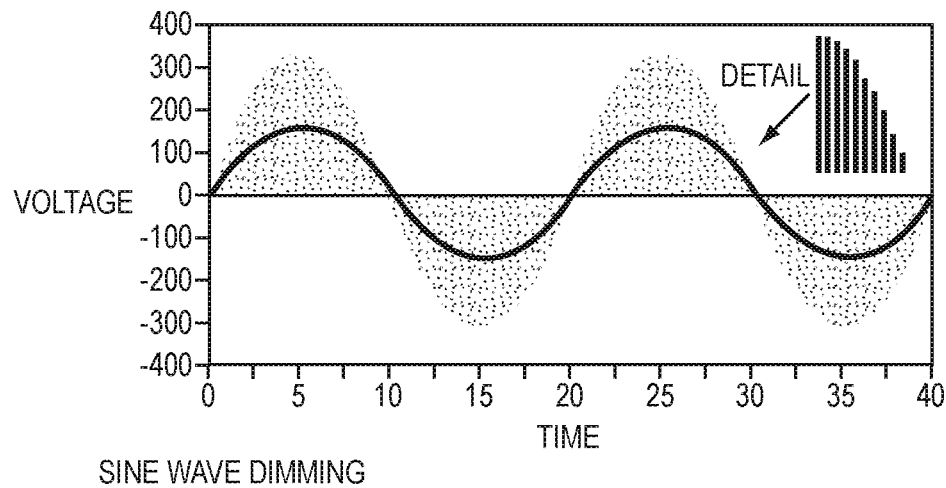
FIG. 6C is a voltage-time graph illustrating sine wave dimming of the type performed by the dimmer circuits of FIG. 6B.
Figure 6D:
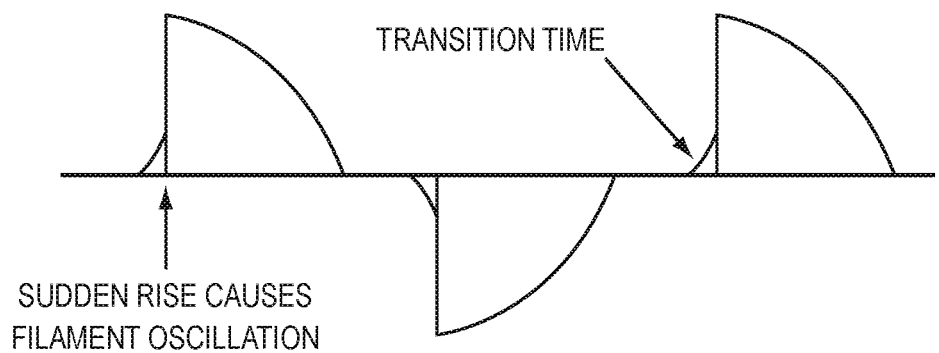
FIG. 6D is a waveform illustrating cut phase dimming.

A dimming function may be implemented using a traditional cut phase dimming technique, as illustrated in FIG. 6D. With a cut phase dimming technique, breaker controller 600 must be capable of switching GaN HEMT transistors 636 on and off at a frequency of 120 Hz. Forward and reverse cut-phase dimming may be implemented by switching the transistors near the appropriate leading or trailing edge of a line waveform. Alternatively, a pulse width modulation dimming technique, sometimes referred to as sine wave dimming, may be used as illustrated in FIG. 6C. With a sine wave dimming technique, GaN HEMT transistors 636 must be switched at much higher frequency (e.g., on the order of 100 kHZ or higher) as compared to cut phase dimming and use a low-pass filter to remove the higher frequency (i.e., has a cutoff frequency less than the higher frequency) from the output sinewave and allow a line frequency to pass through with little attenuation. In order to ensure that breaker controller 600 can signal transistors 636 with sufficient rapidity, it may be necessary to bypass GPIO expander 610 and connect (the GPIO) of breaker controller 600 directly to isolation circuit 632. Another alternative would be a pulse wide modulation driver, such as a Fairchild Semiconductor FL77944MX, that converts an analog or digital input signal into a pulse width modulated output signal.

Figure 7B:
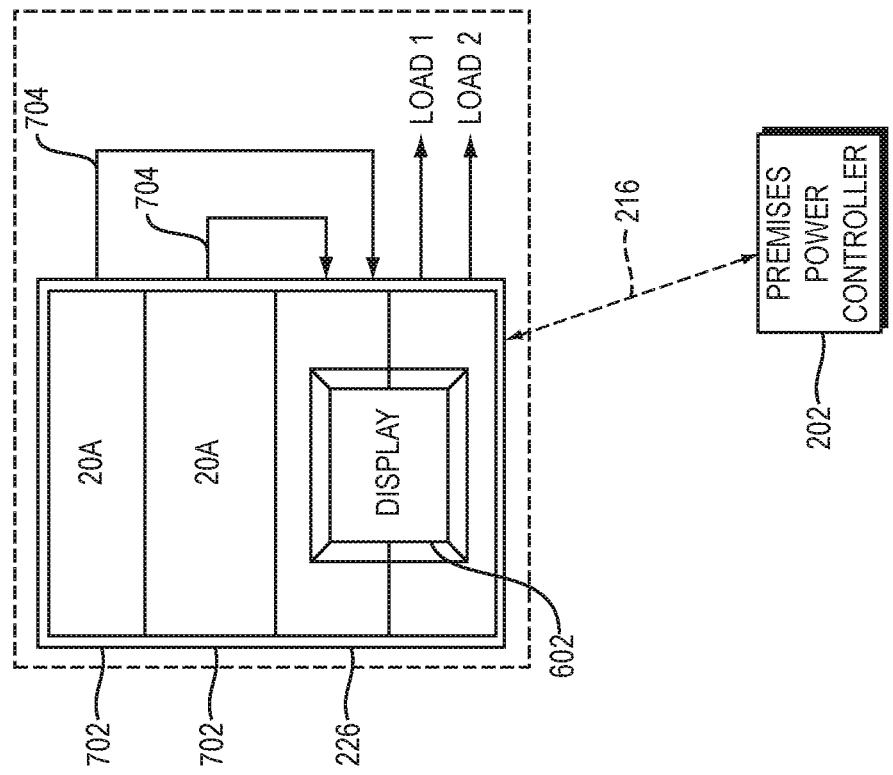
FIGS. 7A and 7B illustrate a circuit breaker panel populated with standard circuit breakers which are paired with intelligent circuit breakers with dimmers.
Figure 7A:
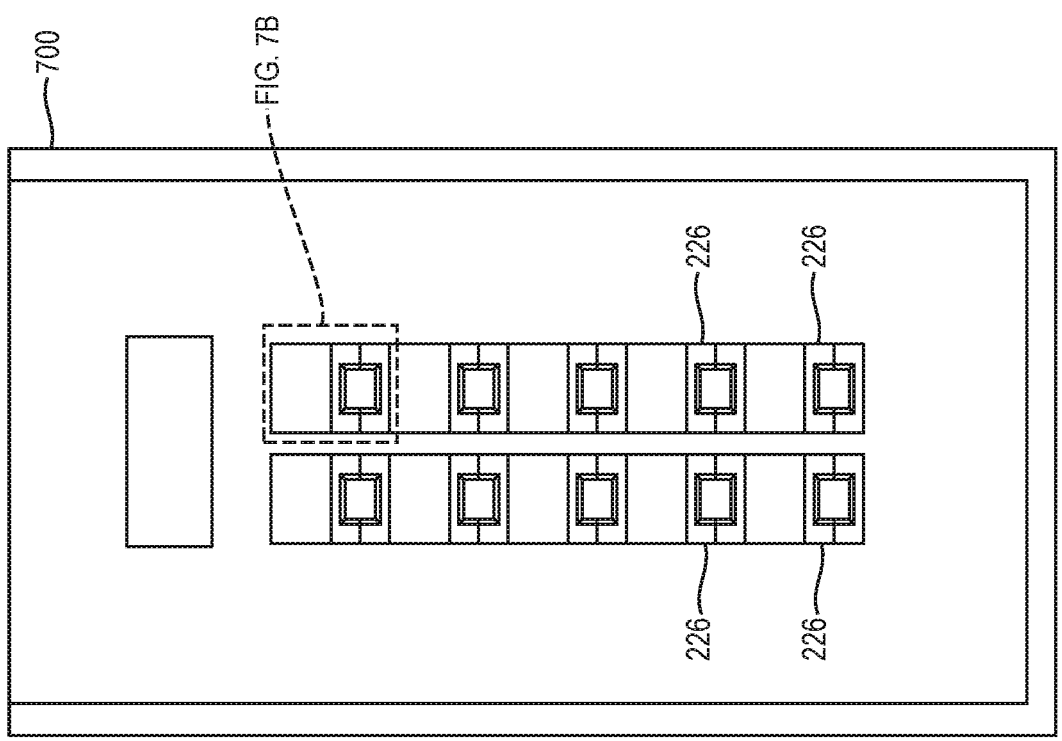

Turning now to FIGS. 7A and 7B, a circuit breaker panel 700 is populated with intelligent circuit breakers with dimmers 226 each of which is connected to a pair of 20A standard (i.e., conventional) circuit breakers 702 by a pair of conductors 704, respectively, and loads 1 and 2 (not shown). In the alternative, the intelligent circuit breakers may be connected to the pair of conductors embodied as a bus bar of the circuit breaker panel 700 obviating use of the conventional circuit breakers 702. Each pair of standard circuit breakers 702 is mounted above and adjacent to the intelligent circuit breaker with dimmer 226 to which it is connected. Display 602 is mounted on the front face of each intelligent circuit breaker with dimmer 226. Breaker controller 600 within each intelligent circuit breaker with dimmer 226 may communicate directly over wireless link 216 with premises controller 202 or, alternatively, may communicate indirectly through a mesh network.

Figure 7C:
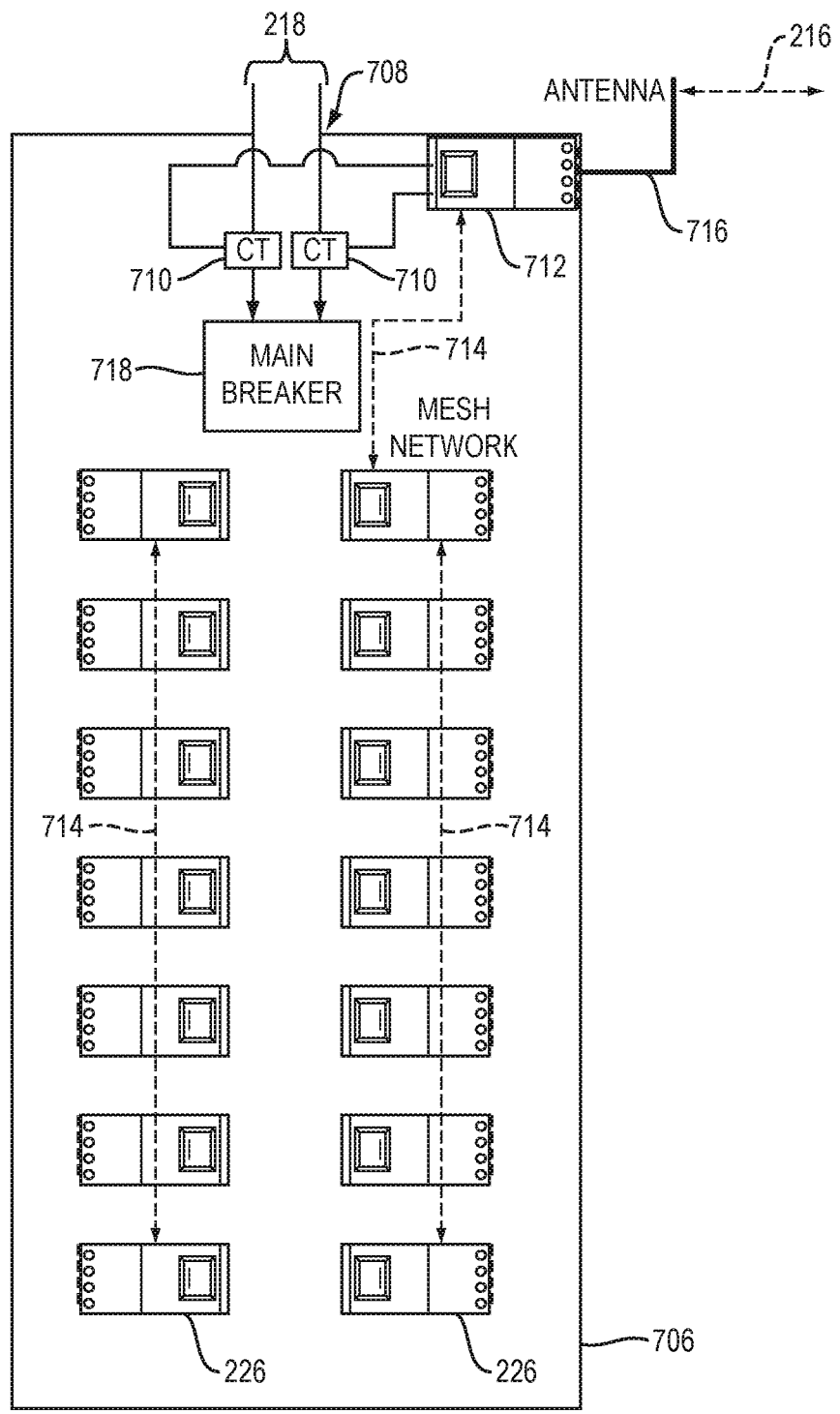
FIG. 7C is a schematic diagram illustrating a gatekeeper transceiver within a circuit breaker panel, and a wireless mesh network interconnecting the gatekeeper transceiver with wireless transceivers associated with intelligent circuit breakers.

FIG. 7C shows a circuit breaker panel 706 which is populated with intelligent circuit breaker with dimmers 226. For improved clarity, the standard circuit breakers which would normally populate the spaces between intelligent circuit breakers with 226 are omitted. A main breaker 718 is conventionally located near the top or bottom of circuit breaker panel 706. Main breaker 718 functions to connect/disconnect all of standard circuit breakers (not shown) and intelligent circuit breakers with dimmers 226 with main conductors 218 which pass through an aperture 708 located in the top edge of circuit breaker panel 706. Main conductors 218 connect with a utility power meter (not shown). A wireless mesh network 714 is established among all of intelligent circuit breakers with dimmers 226 and a gatekeeper transceiver 712 which is coupled to an antenna 716.

Due to interference with wireless communication typically caused by (metal) circuit breaker panel 706, gatekeeper transceiver 712 may be assigned exclusive responsibility for communicating with premises power controller 202 (FIG. 2) over wireless communication link 216. Antenna 716 protruding from circuit breaker panel helps overcome interference as does locating gatekeeper transceiver 712 in proximity to aperture 708. In addition, should a particular environment produce excessive interference, an alternative communication technology could be selected for gatekeeper transceiver 712 without affecting intelligent circuit breakers with dimmers 226. For example, gatekeeper transceiver 712 could be provided with Bluetooth® connectivity to participate in mesh network 714, but could also be provided with a radio frequency (RF) transceiver, an optical transceiver, an infrared (IR) transceiver, or an isolated wire link for communicating with premises power controller 202.

Figure 8:
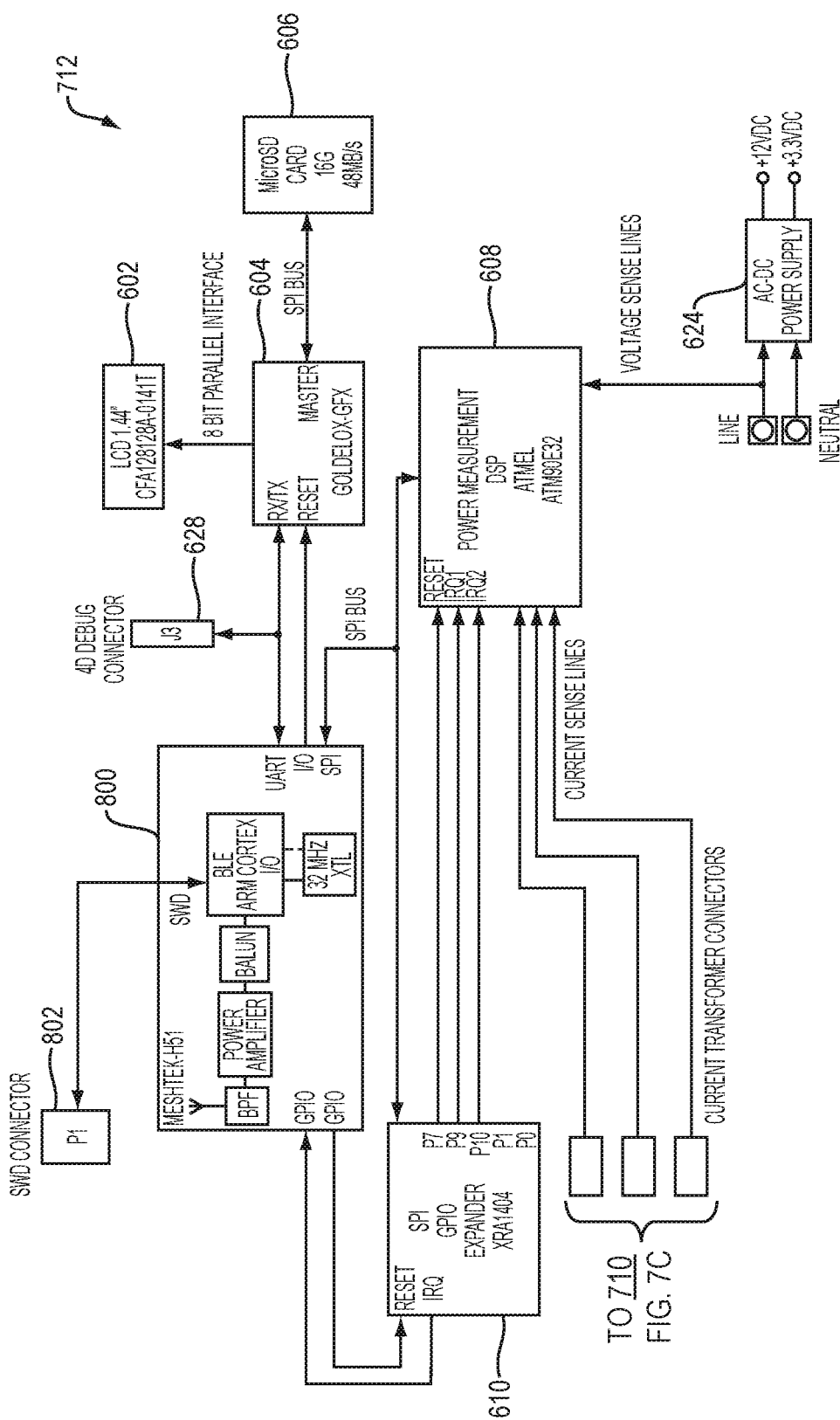
FIG. 8 is a block diagram of a gatekeeper transceiver which includes power monitoring capability.

Gatekeeper transceiver 712 may also include power monitoring functionality for measuring total power consumption (or surplus) at main conductors 218. A current transformer 710 is coupled to each main conductor 218, and to gatekeeper transceiver 712. As may be seen best in FIG. 8, gatekeeper transceiver 712 may include many of the same components as intelligent circuit breaker 222 (FIG. 6A). In addition, a Bluetooth® low energy module 800 provides functionality for participating in mesh network 714 as well as communicating with premises power controller 202. Power measurement DSP 608 is coupled to current transformers 710 (current sense lines) as well as power supply 624 (voltage sense lines), thus enabling calculation of total power consumption (or surplus) at main conductors 218.

Figure 7D:
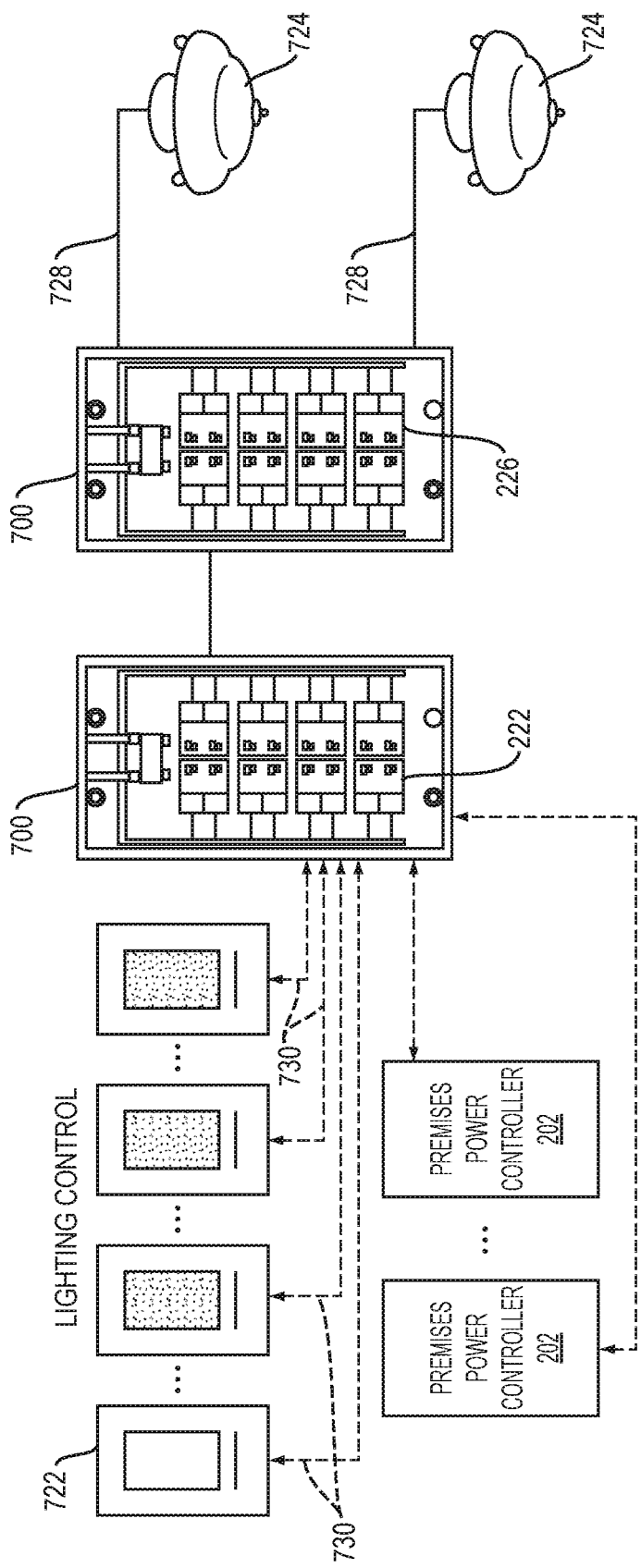
FIG. 7D is a schematic diagram illustrating lighting control keypads may be used as alternative or in addition to a premises power controller for controlling intelligent circuit breakers.

FIG. 7D illustrates a premises in which lighting control key pads may be used as alternatives or in addition to a premises power controller 202 to perform user-oriented functions through intelligent circuit breakers 222 or intelligent circuit breakers with dimmers 226. Wireless lighting control keypads 722, which are commercially available from a number of vendors, may be located in various places within premises to control lamps 724 or other lighting (not shown). Lamps 724 are connected by conductors 728, respectively, to intelligent circuit breakers with dimmers 226.

In general, each wireless lighting control keypad 722 typically includes a processor, microcontroller or the like which is capable of running some or all of the same software run by premises power controller 202 as described herein. In addition, each wireless lighting control keypad 722 typically includes wireless network connectivity such as Wi-Fi or Bluetooth®. With such network connectivity, keypads 722 may establish wireless communication links 730 with intelligent circuit breakers 222 or intelligent circuit breakers with dimmers 226. Thus, any of wireless lighting control keypads 722 may be used as an alternative to, or in conjunction with, premises power controller 202 to turn lamps 724 (or other lighting loads) on or off as well as dimming such lamps.

Figure 9:
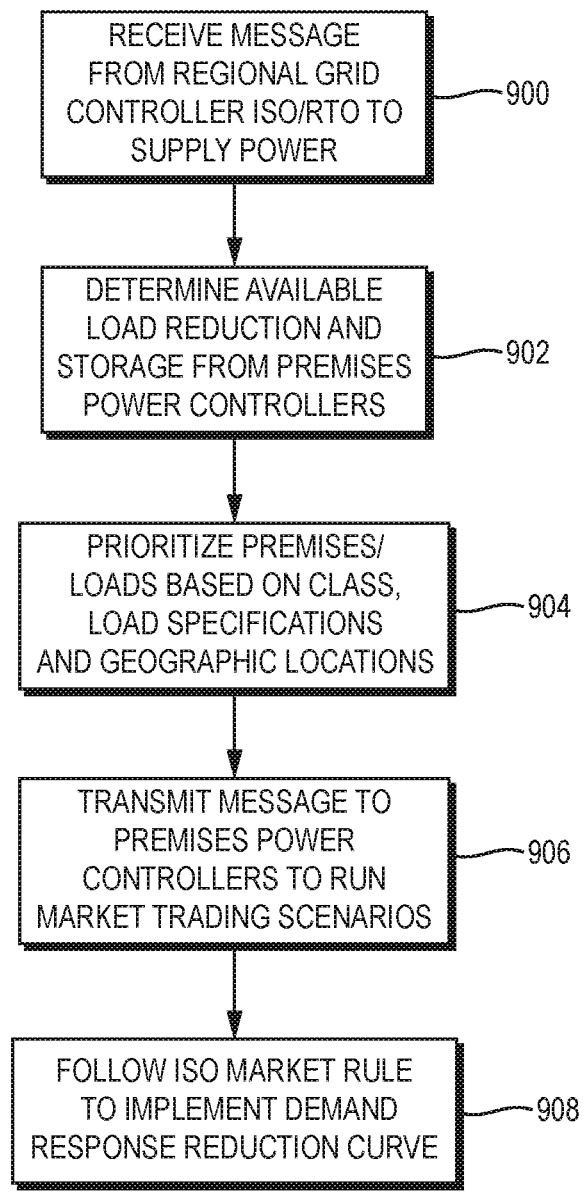
FIG. 9 is a flowchart illustrating the high level operation of the aggregation server shown in FIG. 1 when the aggregation is providing ancillary services.

FIG. 9 illustrates the high level operations of aggregation server 112 (FIG. 1). At step 900, aggregation server 112 receives a message from region grid controller ISO/RTO 102 to supply power. Next, at step 902, aggregation server 112 proceeds to determine how much load reduction and battery storage are available within aggregation 118 by communicating with the premises power controller 202 associated with each premises within the aggregation. Based on information collected during step 902, aggregation server 112 proceeds at step 904 to prioritize particular premises and loads, based on the class of premises, load specifications, and geographic locations (e.g., a profile of the particular premises).

Next, at step 906, aggregation server 112 transmits a message to each premises is power controller 202 within aggregation 118 to run its "market trading" power management scenario. In general, when a given premises power controller 202 run its "market trading" scenario, this will cause particular loads in the premises to be "shed" or disconnected (by actuating the associated intelligent circuit breakers) and, for class 3 premises that include batteries with significant storage capacity, may also result in the connection of such batteries to supply power to the power grid. Next, at step 908, aggregation server 112 follows an ISO market rule to implement a demand response reduction curve.

Figure 10:
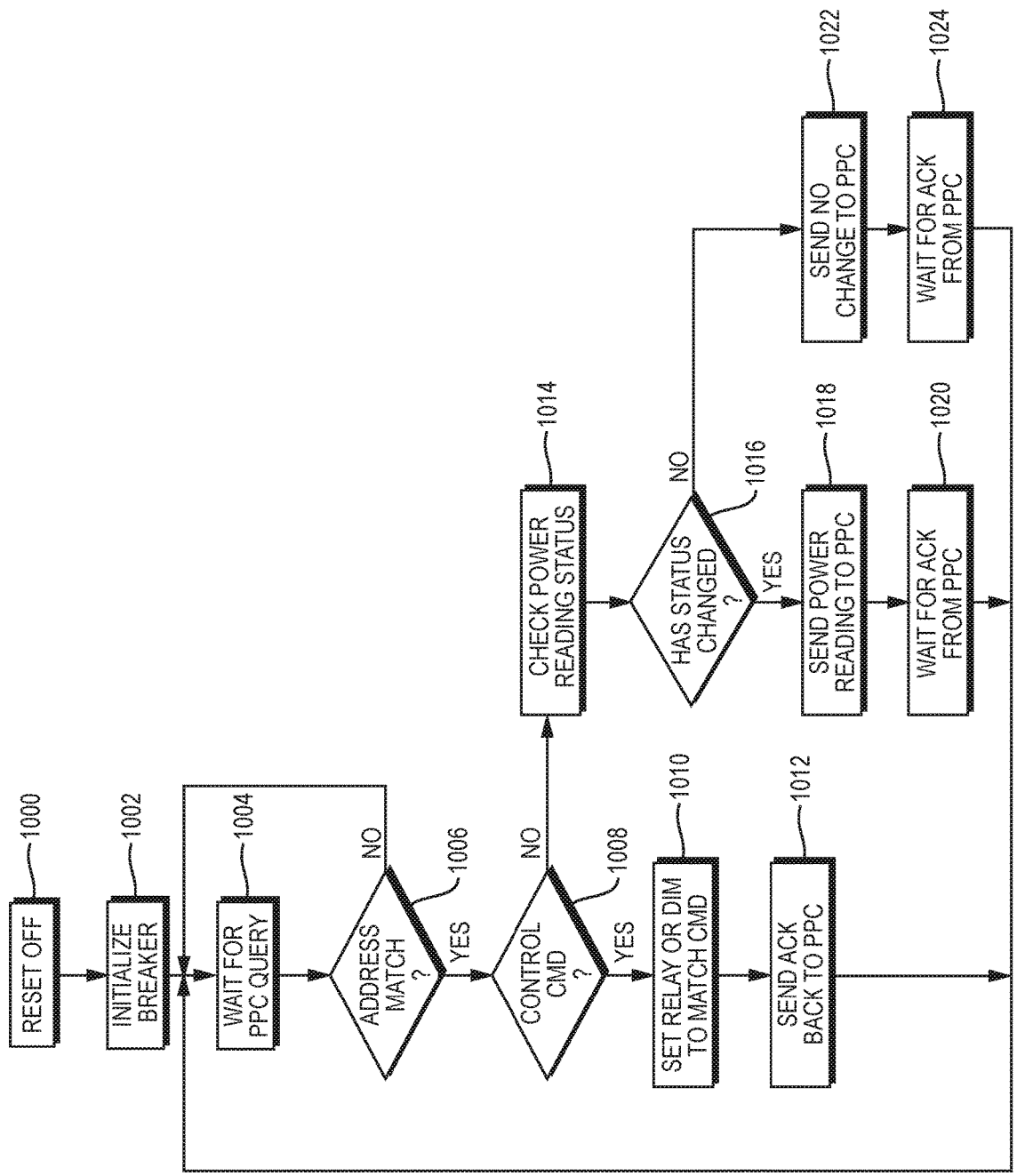
FIG. 10 is a flowchart illustrating communication between the premises power controller and intelligent circuit breakers shown in FIGS. 2, 3, 4A and 4B.

FIG. 10 illustrates exemplary communications between premises power controller 202 (FIG. 5) and intelligent circuit breakers 222 (FIG. 6A) or intelligent circuit breakers with dimmers 226 (FIG. 6B). At step 1000, each intelligent circuit breaker 222 and 226 is in a reset off state, followed by initialization of each such intelligent circuit breaker at step 1002. At step 1004, each initialized intelligent circuit breaker 222 and 226 waits for a query from premises power controller 202. When a query is received (over wireless link 216, for example), a comparison is made between an address contained in the query and an address associated with the intelligent circuit breaker 222, 226 that received the query. If the addresses do not match, the intelligent circuit breaker 222, 226 continues to wait at step 1004 for another query. If the addresses match, at step 1008 a determination is made as to whether the query includes a control command. If so, the intelligent circuit breaker 222, 226 sets its relays 630 (FIG. 6A) or dimmers 634, 636 (FIG. 6B) to match the received control command, and sends an acknowledgement to premises power controller 202 at step 1012. During operation, the intelligent circuit breaker transmits the instantaneous power consumption of the load to the premises power controller at predetermined intervals.

Alternatively, at step 1008, if the determination indicates that no control command was received, then intelligent circuit breaker 222, 226 checks its power reading status at step 1014. If that status has changed compared to a last known status, as determined at step 1016, then intelligent circuit breaker 222, 226 sends its power reading to premises power controller 1018, and subsequently waits for an acknowledgement from the premises power controller at step 1020. If, at step 1016, no change in power reading is status was found, then at step 1022 intelligent circuit breaker 222, 226 sends an indication of no change to premises power controller 1022, and subsequently waits for an acknowledgement from the premises power controller at step 1024.

Figure 11A:
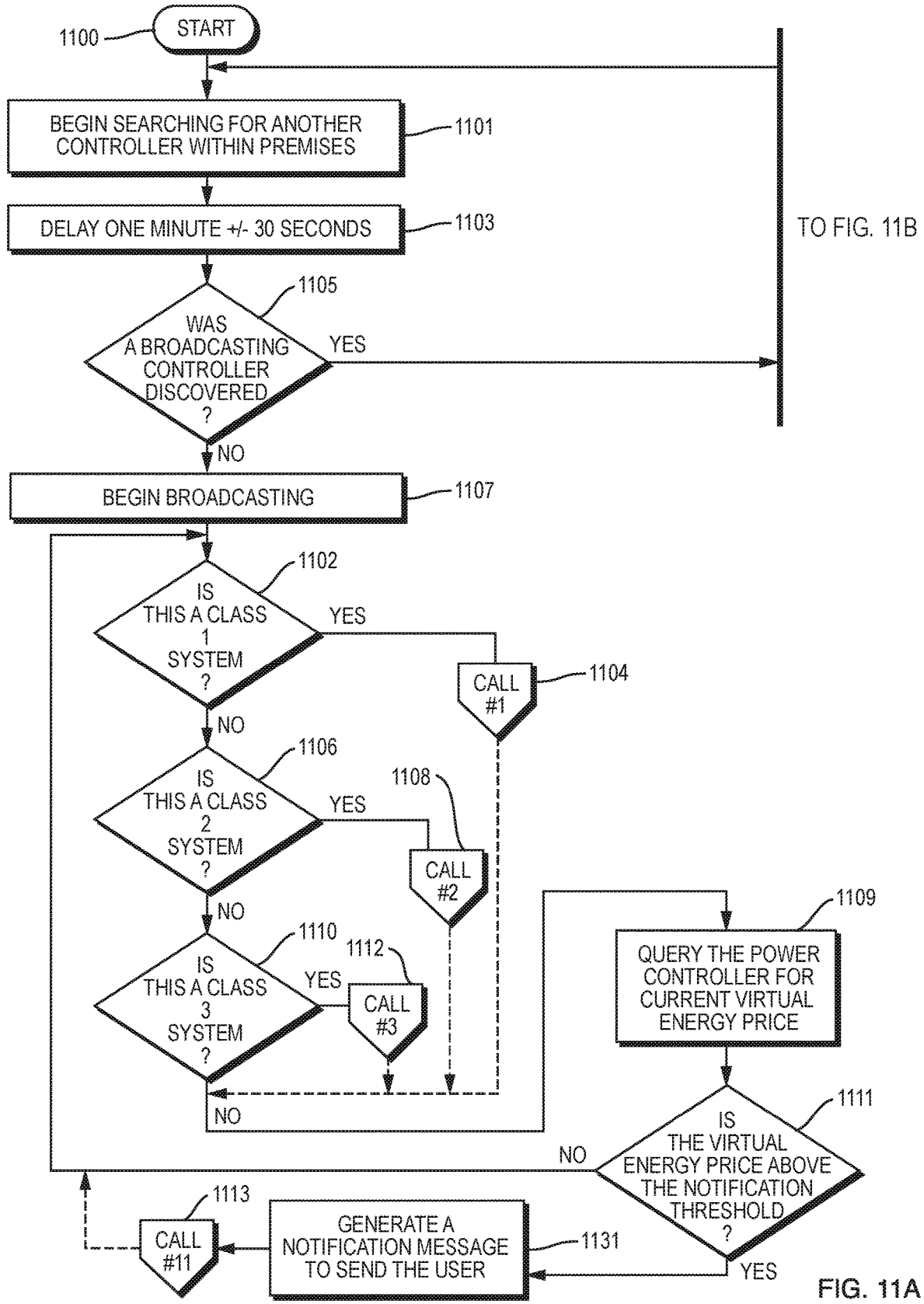
FIGS. 11A-11H are a flowchart illustrating the high level control methods performed by premises power controller for each of Class 1, 2, and 3 premises.
Figure 11B:
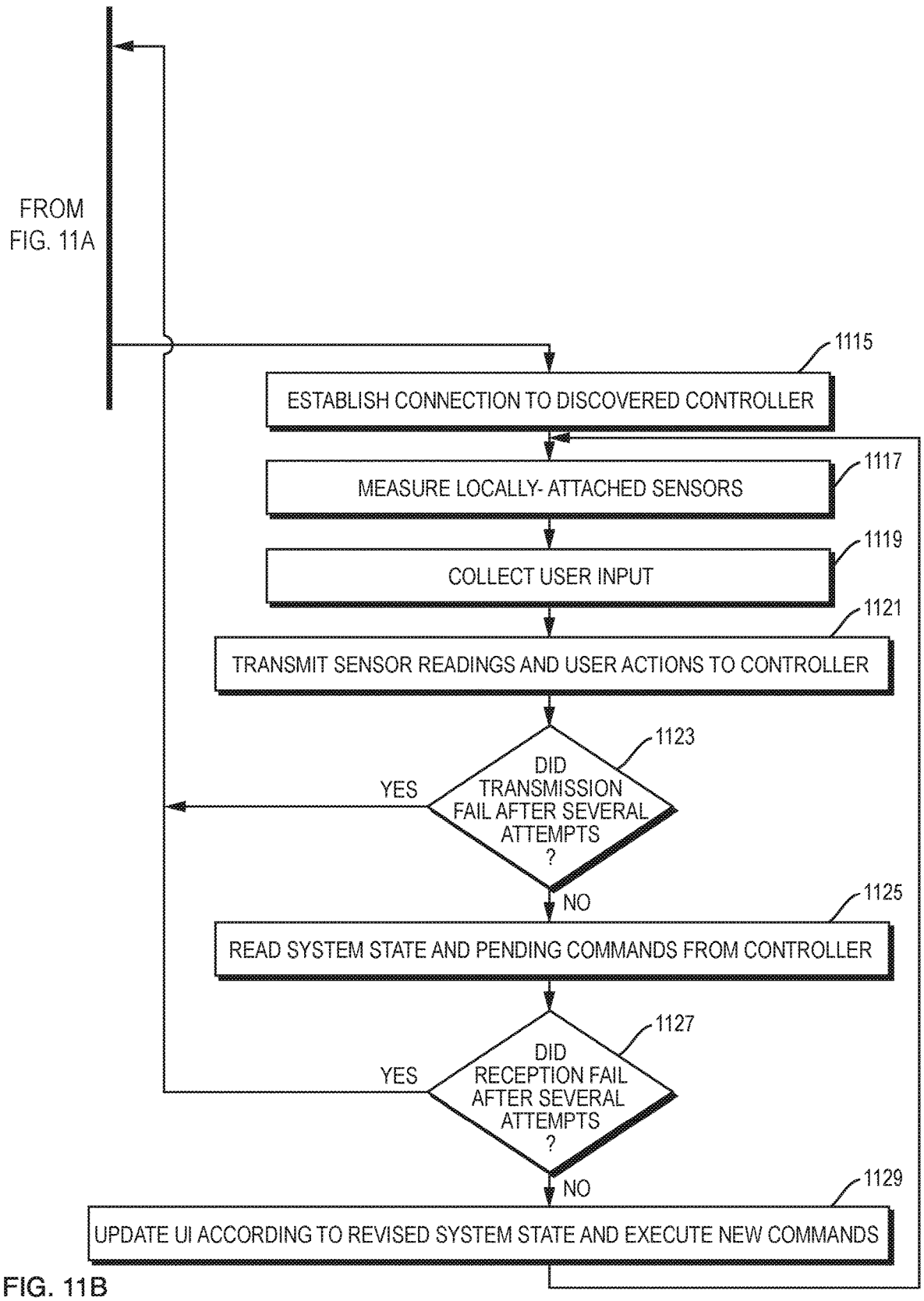
Figure 11C:
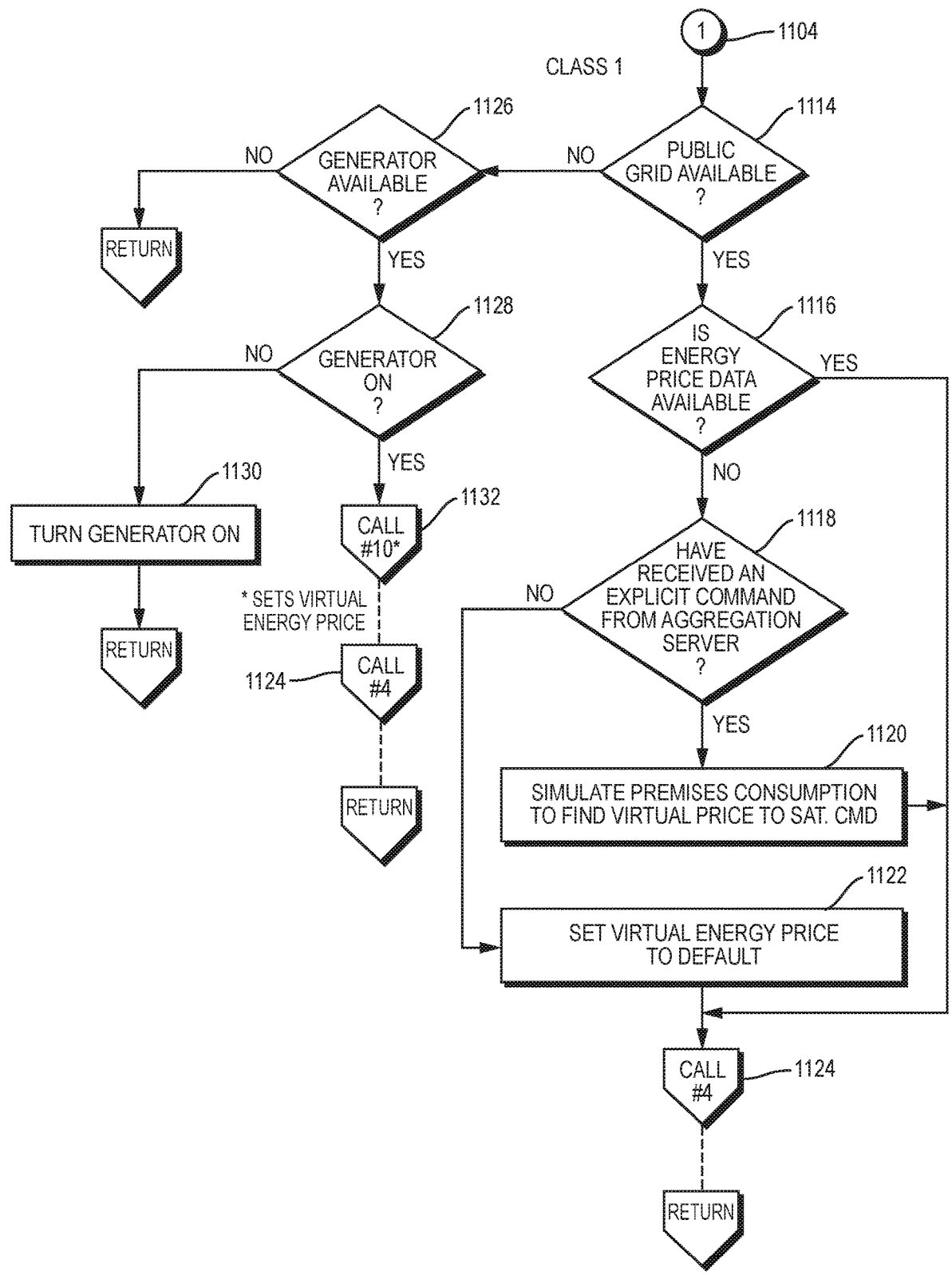
Figure 11D:
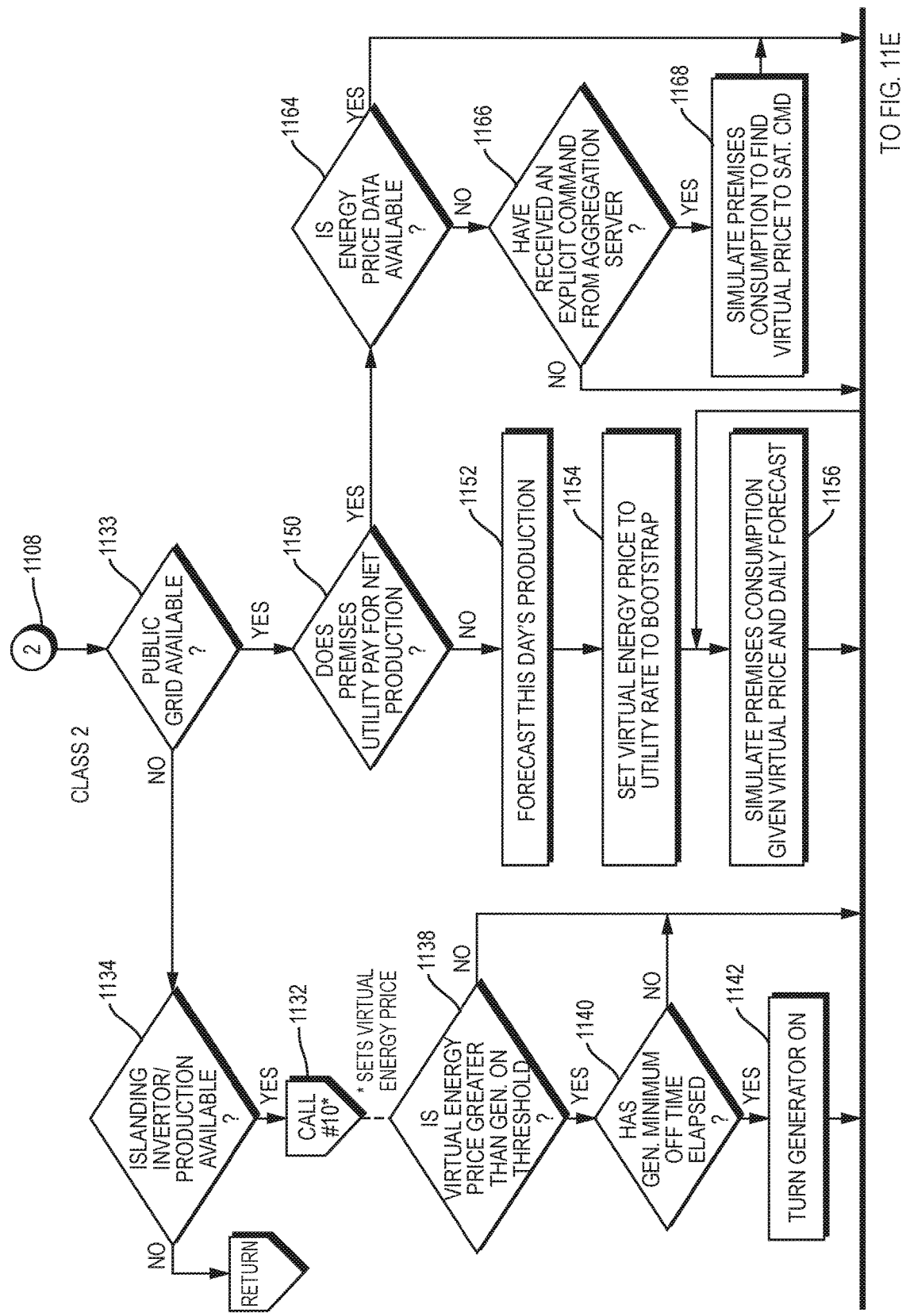

FIGS. 11A-11H illustrate the high level control methods performed by premises power controller 202 for each of Class 1, 2, and 3 premises. The methods start at step 1100, followed by step 1101 at which a premises power controller 202 begins searching (e.g., using a wireless discovery service) for another controller 202 within the premises. This is followed by a delay at step 1103. Next, at step 1105, a determination is made whether a broadcasting premises power controller was discovered. If not, control flow advances to step 1107 where the only premises power controller 202 present begins broadcasting. This is followed by a first decision step 1102 which determines whether the premises (system) in which premises power controller 202 is located is a Class 1 premises. If so, control flow advances to step 1104 and on to FIG. 11B. If not, a decision step 1106 determines whether the premises is a Class 2 premises and, if so, control flow advances to step 1108 (FIG. 11C). If not, a decision step 1110 determines whether the premises is a Class 3 premises and, if so, control flow advances to step 1112 (FIG. 11D).

If, at step 1110, a determination is made that the premises is not a Class 3 premises, control flow advances to step 1109 at which a query of premises power controller 202 is made for a current virtual energy price. The term "virtual energy price" is used in this specification to refer to a value that serves as a proxy for the relative scarcity or abundance of energy. Each action relating to a load or source within a given premises is associated with either a threshold or scaling factor against the virtual energy price. In its simplest formulation, a system based on a virtual energy price may implement a priority list of loads or sources capable of both discrete and smooth transitions (i.e., capable of smoothly transitioning and discretely transitioning power consumption or generation) as well as selection of the loads based on temporal use (e.g., a recency of use). In a more sophisticated implementation, such a system could model the full dynamism of an energy market.

By choosing a quantity with the same units and order of magnitude as is typical on the public energy market, it is possible for a user to specify his or her priorities once, is and in terms of real dollars. In cases where the premises pays market rates for energy, the power grid is available, and market rates are provided by aggregation server 112, this will be especially meaningful to the user. In other cases, the virtual energy price will be computed to perform the actions necessary for the effective management of system resources and will not have any relationship to energy costs on the public market.

As an alternative to calculating a virtual energy price, a state machine could be implemented which accesses a lookup table or other data structure to obtain a value which is a suitable reference or proxy for the purposes described herein.

Next, at step 1111, a determination is made whether the virtual energy price is above a notification threshold. If not, control flow loops to step 1102. If so, meaning that a user notification should be sent, control flow advances to step 1113 (FIG. 18).

Referring again to step 1105, if a (second) broadcasting premises power controller 202 was discovered, control flow advances to step 1115 in which wireless communication is established between the discovered (master) premises power controller 202 and the (subordinate) premises power controller 202 performing this step. Next, at step 1117, the subordinate premises power controller 202 takes measurements from any sensors attached to it. This is followed, at step 1119, by the subordinate premises power controller 202 collecting user input. Next, at step 1121, the subordinate premises power controller 202 attempts to transmit its sensor measurements and user actions to master premises power controller 202.

At step 1123, a determination is made whether the attempted transmission to the master premises power controller failed. If so, control flow loops to step 1101. If not (meaning transmission was successful), control flow advances to step 1125 at which subordinate premises power controller 202 attempts to read system state and pending commands from master premises power controller 202. Next, at step 1127, a determination is made whether the attempted read failed. If so, control flow loops to step 1101. If not (meaning the read was successful), control flow advances to step 1129 at which subordinate premises power controller 202 updates its user interface according to the previously read system state, and executes new commands. If either the transmission failed at step 1121, or reception failed at step 1125, it is assumed that master premises is power controller 202 has been removed, powered down, or failed, and an election for a new controller is performed at step 1101. In this fashion, multiple, redundant premises power controllers 202 may be operated within a given premises.

Referring now to FIG. 11C (Class 1 premises), premises power controller 202 determines at step 1114 whether public power grid 100 (FIG. 1) is available. If not, a determination is made at step 1126 whether a (backup) generator 228 (FIG. 2) is available. If no generator is available, control flow returns to FIG. 11A. If a backup generator 228 is available, then premises power controller 202 determines at step 1128 whether the backup generator is on. If not, premises power controller 202 turns the generator on at step 1130, after which control flow returns to FIG. 11A. If, at step 1128, premises power controller 202 determines that the generator is on, then control flow advances to step 1132 (FIG. 17A) to establish a virtual energy price, then to step 1124 (FIG. 11H).

If, at step 1114, premises power controller 202 determines that public power grid 100 is available, control flow advances to a determination at step 1116 whether energy price data is available. Energy price data may be supplied to premises power controller 202 by aggregation server 112 or other external source via WAN 116. If energy price data is available, control flow advances to step 1124 (FIG. 11H). If energy price data is not available, control flow advances to step 1118 for a determination whether premises power controller 202 has received an explicit command (message) from aggregation server 112 that aggregation 118 is acting or preparing to act as a participant in the energy markets. Such a command means that premises power control 202 must prepare to reduce loads on the premises in order for aggregation 118 to meet the regulatory requirements of an energy market participant. Assuming that such a command was received, control flow advances to step 1120 at which premises power controller 202 simulates premises power consumption to find a virtual energy price which will satisfy the requirements of aggregation 118 performing as a market participant.

Figure 11E:
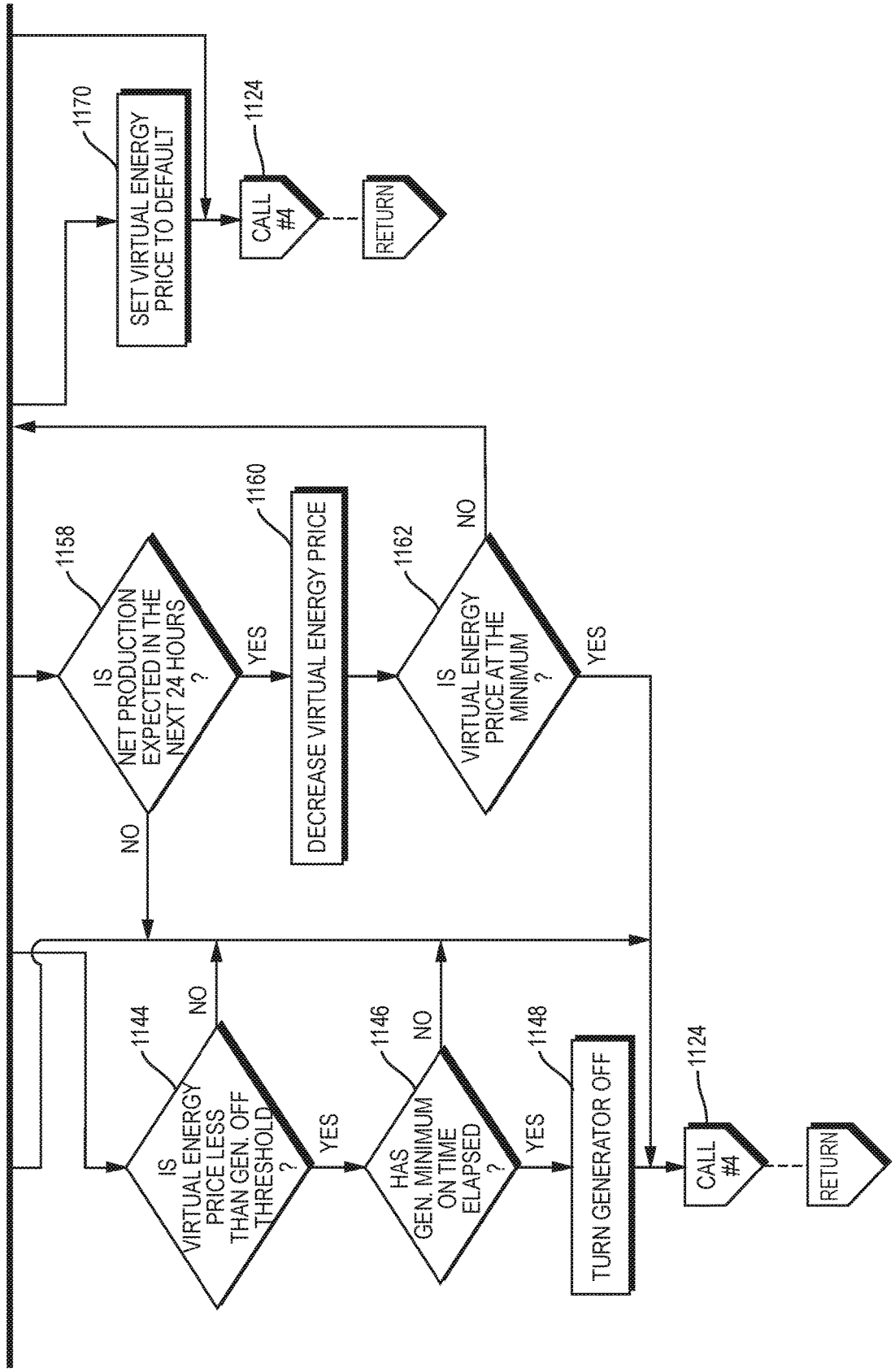
Figure 11F:
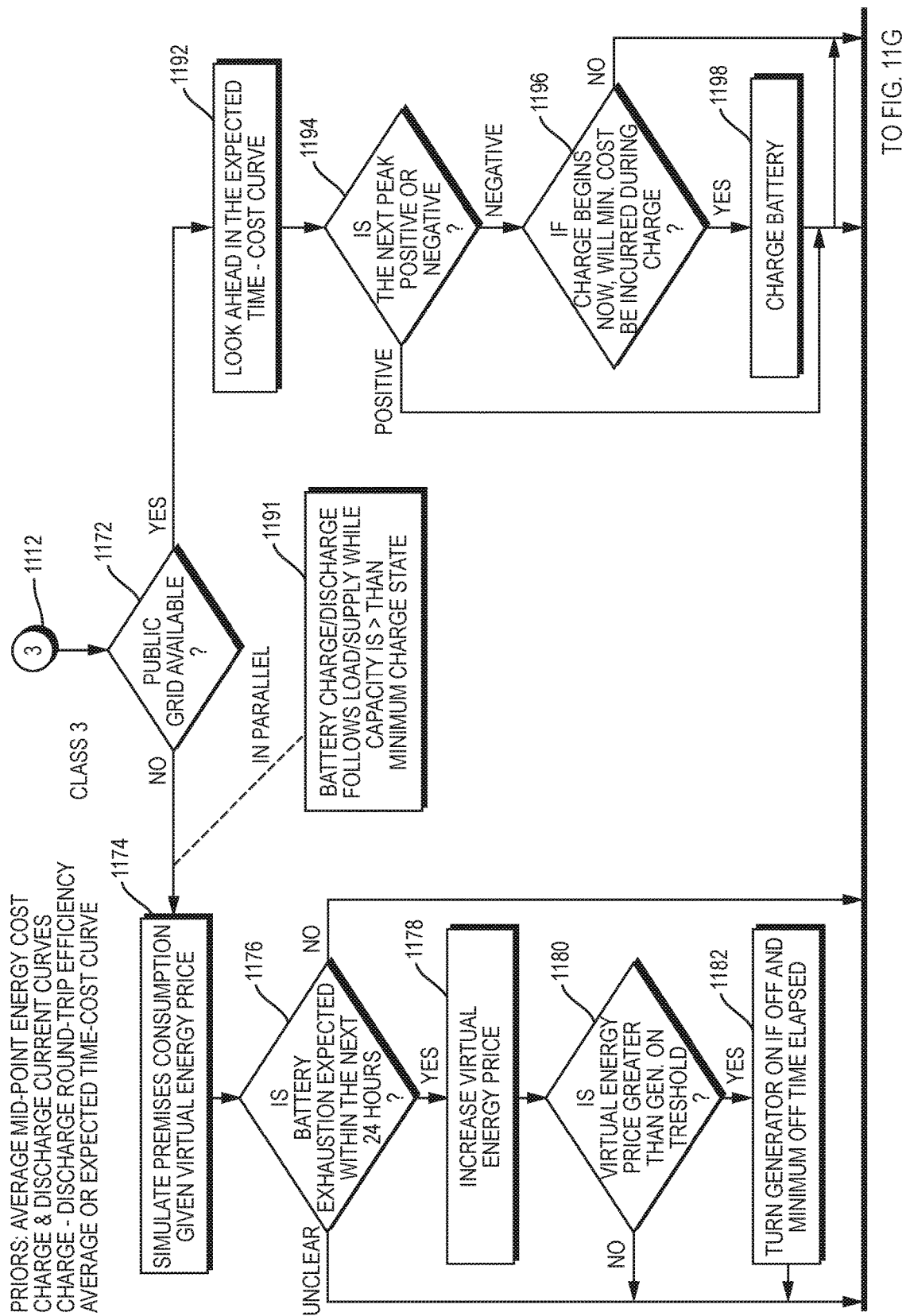
Figure 11G:
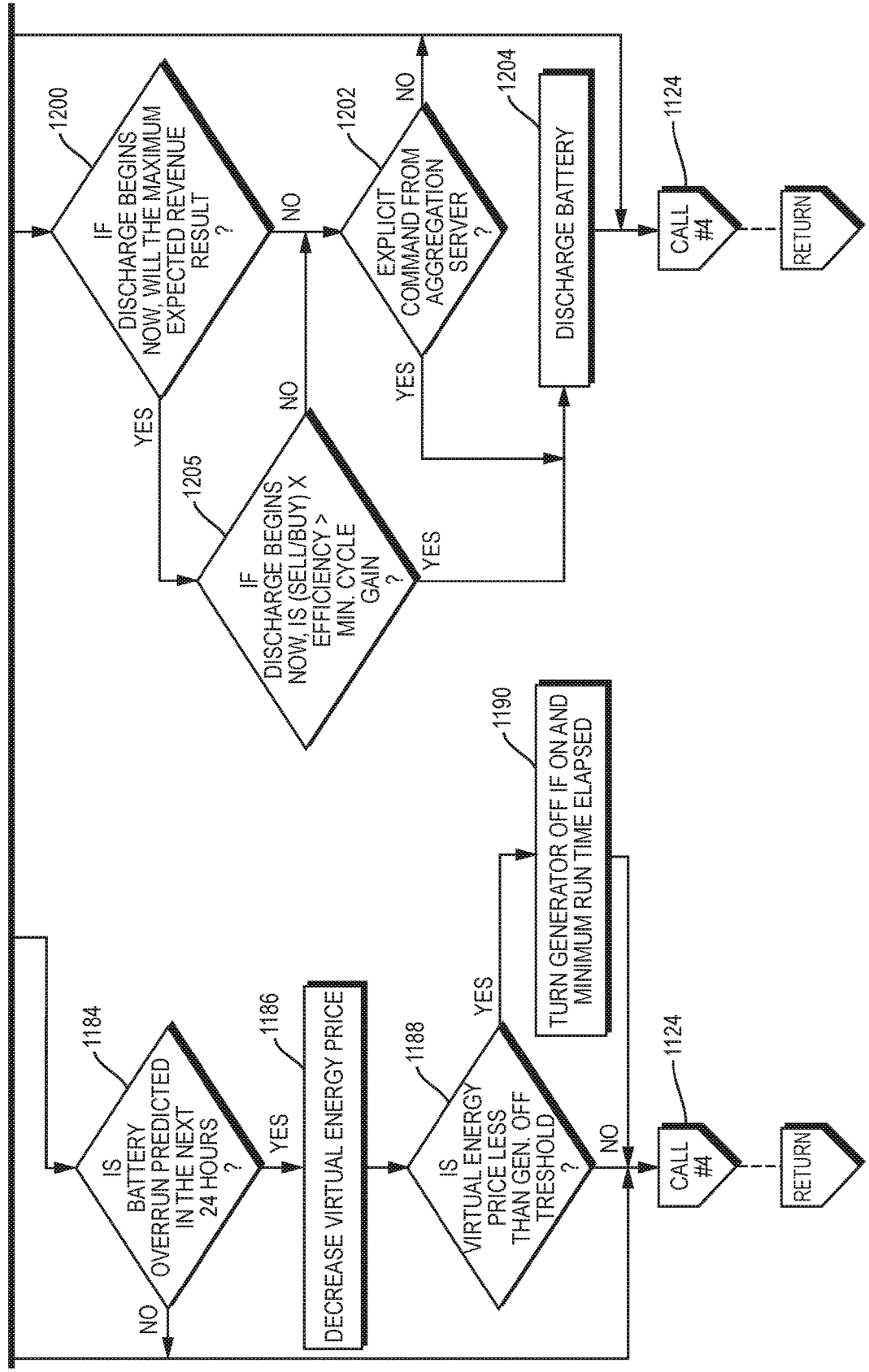
Figure 11H:
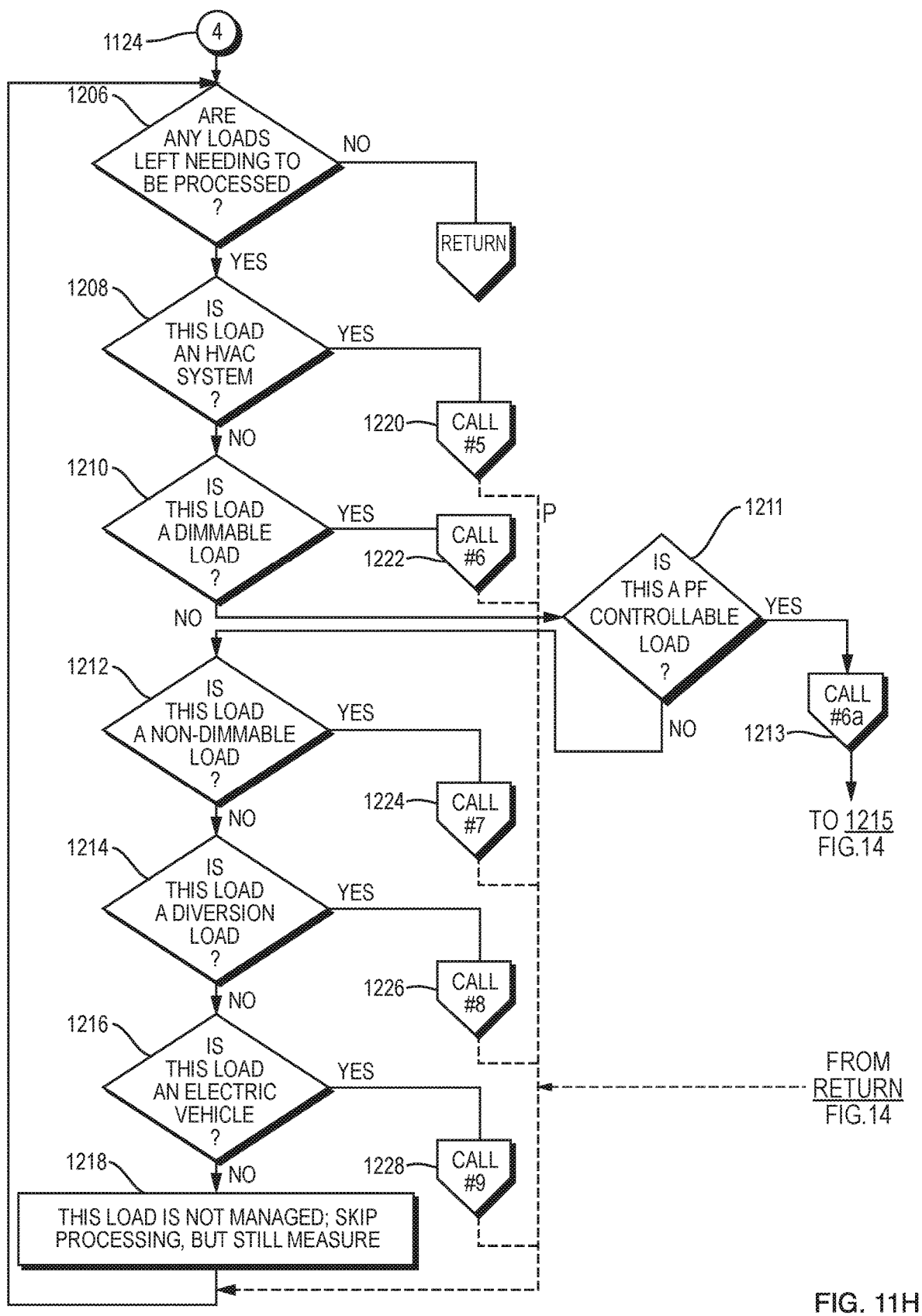

If, at determination step 1118, no explicit command was received from aggregation server 112 (meaning aggregation 118 is not currently required to perform as a market participant), then control flow advances to step 1122 at which a virtual energy price is set to a default value, and then to step 1124 (FIG. 11H).

Figure 17A:
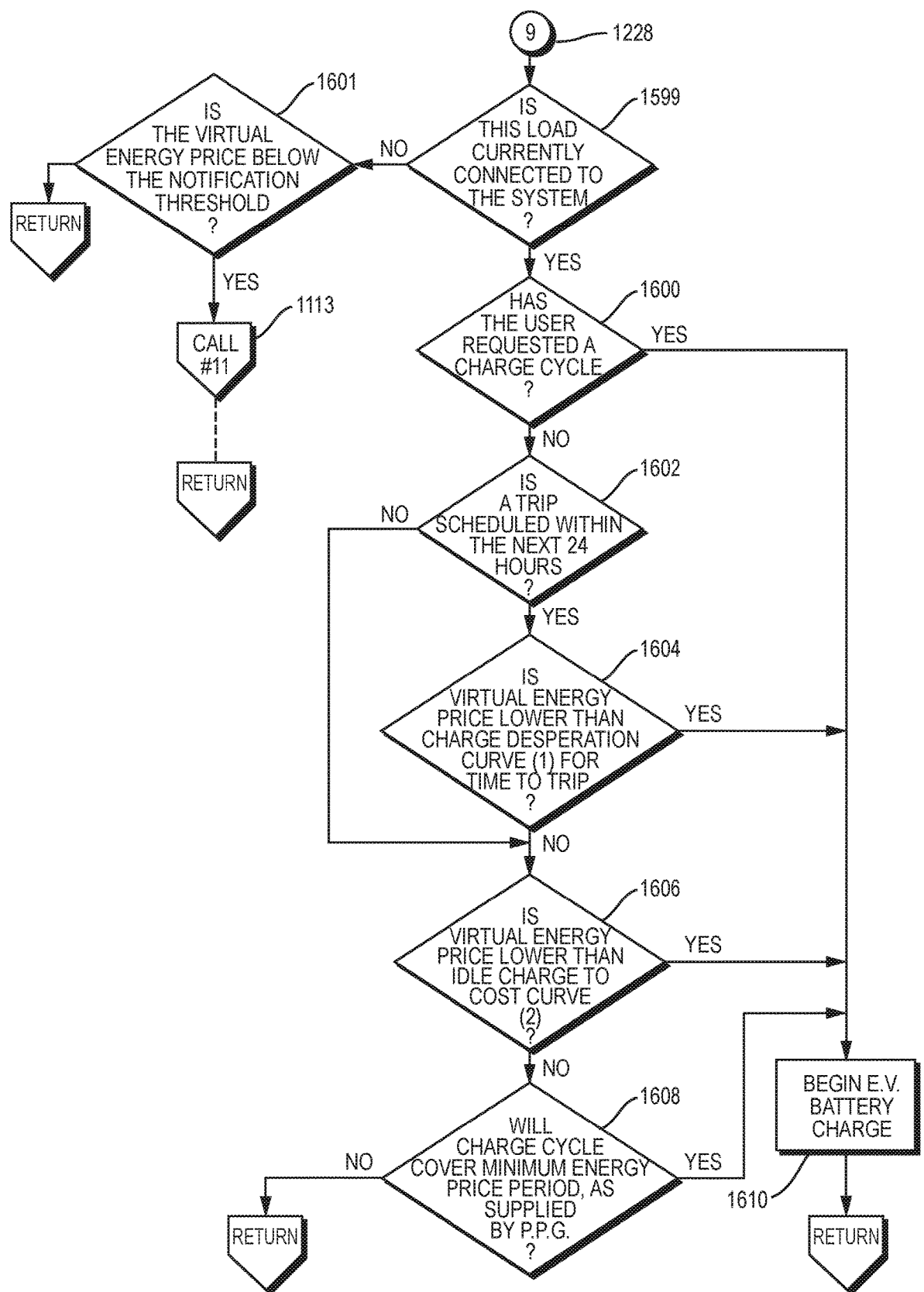
FIG. 17A is a flowchart for a premises power controller managing an electric vehicle load.

Turning now to FIG. 11C (Class 2 premises which includes at least one renewable source and a backup generator, but does not include a battery of significant capacity), premises power controller 202 determines at step 1133 whether public power grid 100 (FIG. 1) is available. If not, control flow advances to step 1134 at which a determination is made whether an islanding inverter/production is available. If not, control flow returns to FIG. 11A. If so, at step 1132, control flow advances to calculate a virtual energy price (FIG. 17A). Next, at step 1138, premises power controller 202 compares the calculated virtual energy price with a predetermined backup generator on threshold value. If the calculated virtual energy price is greater than the backup generator on threshold value (meaning that it is economical to run the backup generator), flow control determines at step 1140 whether a generator minimum off time has elapsed. If so, premises power controller 202 turns the (non-renewable source) backup generator on at step 1142, followed by control flow advancing to step 1124 (FIG. 11H).

If, at step 1138, the calculated virtual energy price was less than or equal to the backup generator on threshold value, or at step 1140 the backup generator's minimum off time has not yet elapsed, then control flow advances to step 1144 where premises power controller 202 determines whether the calculated virtual energy price is less than the generator off threshold value. It should be noted that the backup generator on and off threshold values are different to add hysteresis and avoid a condition where the backup generator is cycling on and off. If the calculated virtual energy price is less than the generator off threshold value, premises power controller 202 next determines at step 1146 whether a generator minimum on time has elapsed and, if so, proceeds at step 1148 to turn the generator off. If, at step 1144, the calculated virtual energy price is not less than the generator off threshold value (i.e., they are equal within the hysteresis band) or, at step 1146, the generator minimum on time has not yet elapsed, the control flow advances to step 1124.

Referring again to step 1133, if public power grid 100 is available, then control flow advances to step 1150 where a determination is made whether the utility company which serves the premises pays for net production of power. If not, then control flow advances to step 1152 where premises power controller 202 makes a forecast of the current day's on-premises power production, followed by step 1154 at which the virtual energy price is set to the rate charged by the utility company.

Next, at step 1156, premises power controller 202 simulates premises power consumption using the virtual energy price and forecast. If, based on the simulation, no net production of power is expected for the next 24 hours (i.e., all on-premises power production will be consumed), control flow advances to step 1124 (FIG. 11H). Alternatively, if at step 1158, net power production is expected for the next 24 hours, the virtual energy price is decreased at step 1160 (i.e., the virtual energy price is decreased because a power surplus is expected for the premises). A determination is made at step 1162 whether the (decreased) virtual energy price is at the minimum. If not, control flow loops through steps 1156, 1158, 1160, and 1162, iteratively reducing the virtual energy price until it reaches the minimum, thus enabling control flow to advance to step 1124.

Referring again to step 1150, if the utility company which serves the premises pays for net power production, control flow advances to step 1164 at which a determination is made whether energy price data is available. If so, control flow advances to step 1124. If not, a determination is made step 1166 whether an explicit command (message) was received from aggregation server 112. If not, meaning aggregation 118 is not currently required to perform as a market participant, then control flow advances to step 1170 at which a virtual energy price is set to the default value, and then to step 1124. If, at step 1166, a command was received from aggregation server 112 (meaning aggregation 118 is required to perform as a market participant and premises power controller 202 needs to reduce loads), then at step 1168 premises power controller 202 simulates premises power consumption to find a virtual price that satisfies the requirements of aggregation 118 performing as a market participant.

Referring now to FIGS. 11F and 11G (Class 3 premises which includes at least one renewable source as well as one or more batteries of significant capacity, and a backup generator), premises power controller 202 determines at step 1172 whether public power grid 100 (FIG. 1) is available. If not, control flow advances to step 1174 where premises power controller 202 simulates premises power consumption using a virtual energy price. In parallel with the step 1174 branch, step 1191 is performed in which battery is charge/discharge follows load/supply while battery capacity is greater than a minimum charge state. At step 1176, a determination is made whether battery exhaustion is expected within the next 24 hours. If it is unclear whether battery exhaustion will occur in the next 24 hours, control flow advances to step 1124 (FIG. 11H).

If battery exhaustion will occur within the next 24 hours, control flow advances to step 1178 at which the virtual energy price is increased (i.e., the virtual energy price is increased because a power scarcity is forecast for the premises). Next, at step 1180, a determination is made whether the (increased) virtual energy price is greater than a generator on threshold value. If not, control flow advances to step 1124. If so, control flow advances to step 1182 and the (non-renewable source) generator is turned on, provided it was off and a minimum off time has elapsed, followed by an advance to step 1124.

Referring again to step 1176, if battery exhaustion is not expected within the next 24 hours, then control flow advances to step 1184 at which a determination is made whether battery overrun is predicted within the next 24 hours. If not, control flow advances to step 1124. If so, control flow advances to step 1186 and the virtual energy price is decreased, again representing an expected power surplus for the premises. Next, at step 1188, a determination is made whether the virtual energy price is less than a generator off threshold value. If not, control flow advances to step 1124. If so, at step 1190, premises power controller 202 turns off the generator, assuming it was on and a minimum run time had elapsed.

Referring again to step 1172, if the public power grid 100 is available, control flow advances to step 1192 where premises power controller 202 performs a look ahead on an expected time-cost curve. Next, at step 1194, a determination is made whether the next peak on the expected time-cost curve is positive or negative. If a negative peak is expected, control flow advances to step 1196 at which a determination made whether if charging begins now will minimum cost be incurred during the charge cycle. If not, control flow advances to step 1124. If so, control flow advances to step 1198 where premises power controller 202 enables the battery to start charging, followed by an advance to step 1124.

If, at step 1194, a positive peak is expected, control flow advances to step 1200 at which a determination is made whether if battery discharge begins now, is the product of the sale revenue minus buy costs and the battery efficiency greater than the minimum cycle gain (i.e., will discharging yield a minimum gain to justify wear on equipment). If so, control flow advances to step 1205 where a determination is made whether if battery discharge begins now is a sell-buy efficiency greater than minimum cycle gain. If so, control flow advances to step 1204 and battery discharge begins. If not, control flow advances to step 1202 where a determination is made whether an explicit command (message) was received from aggregation server 112 to perform as a market participant. If so, control flow advances to step 1204 to begin battery discharge. If not, control flow advances to step 1124.

Figure 12A:
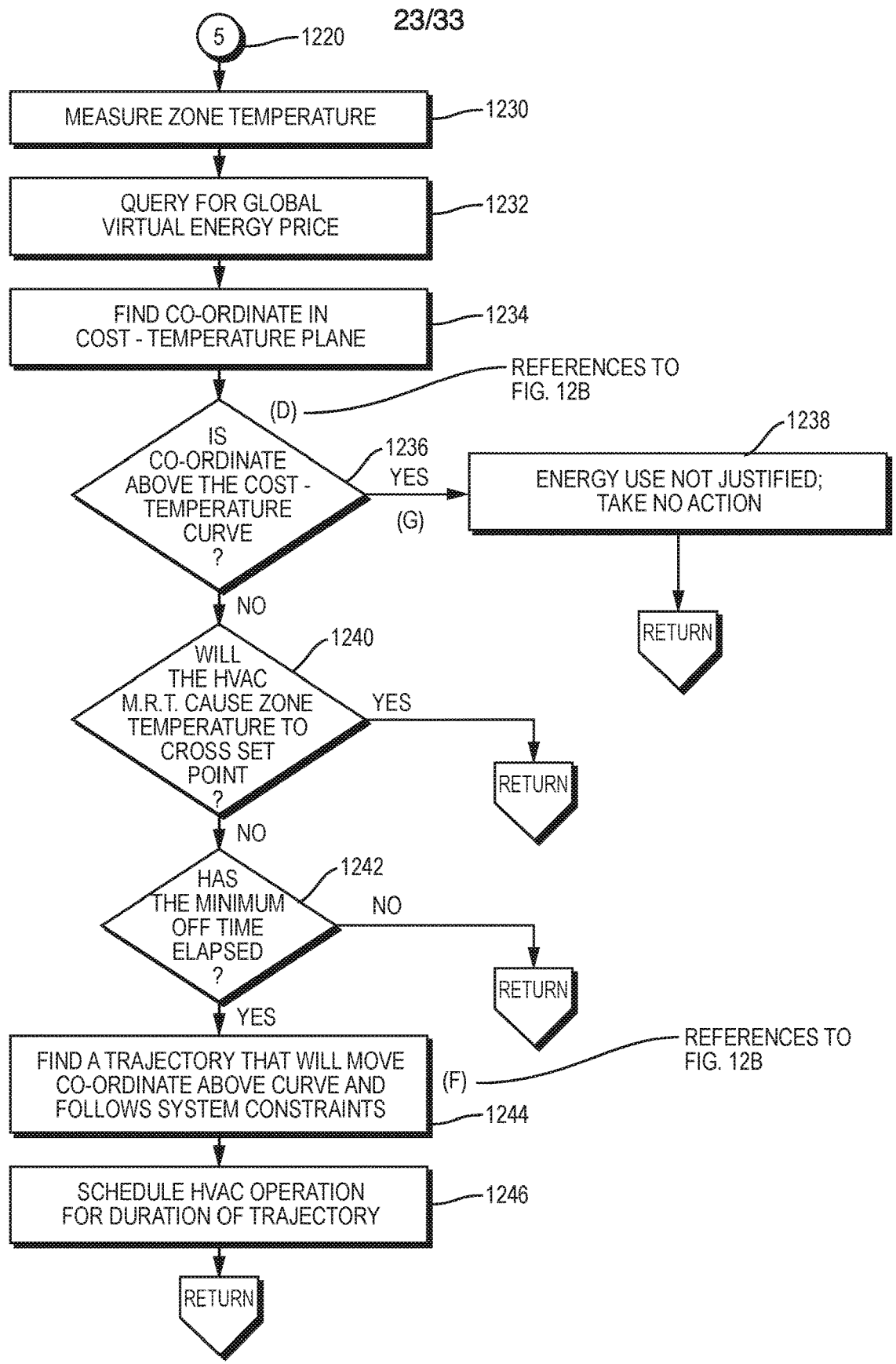
FIG. 12A is a flowchart for a premises power controller managing an HVAC load.
Figure 13A:
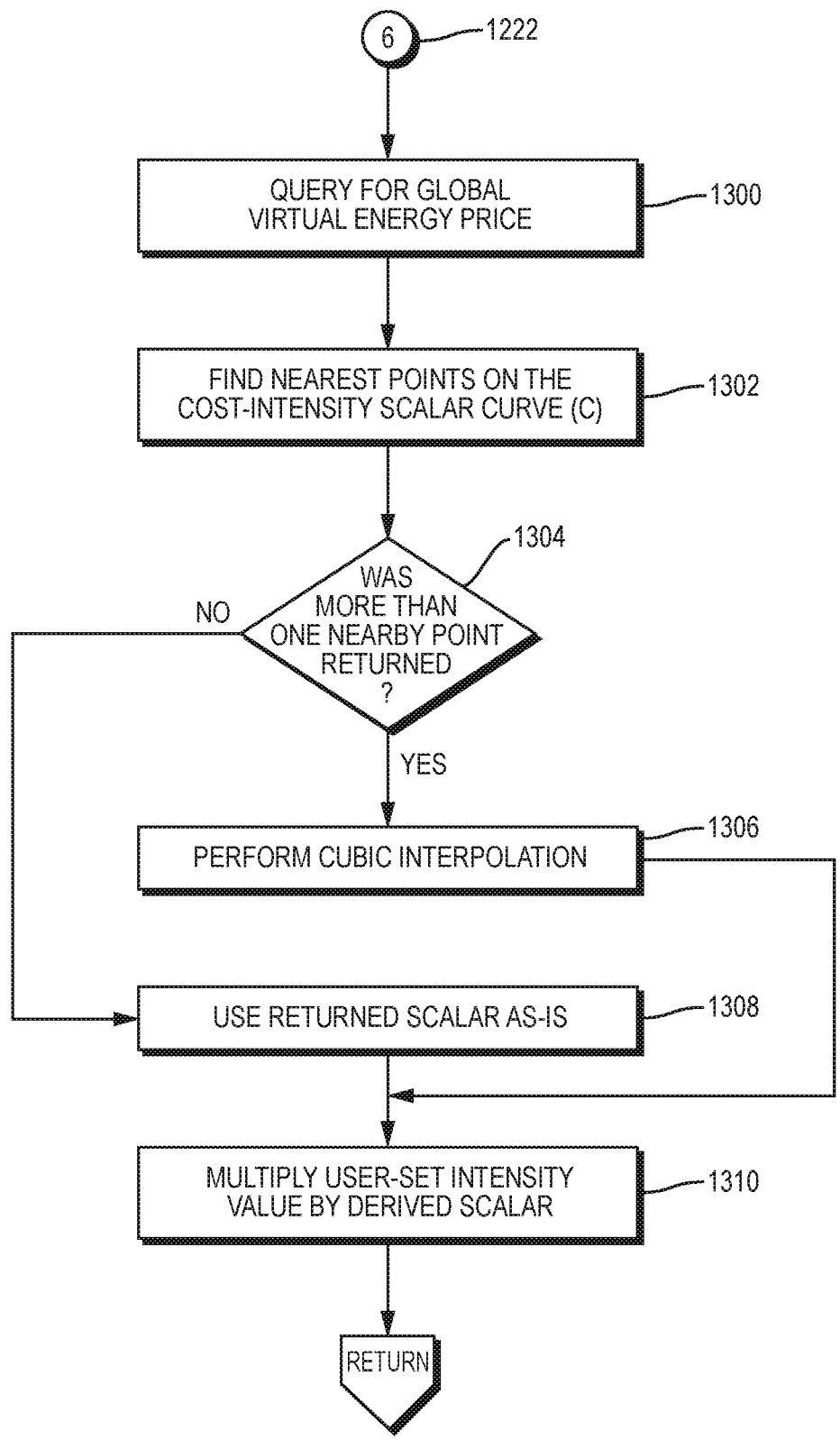
FIG. 13A is a flowchart for a premises power controller managing a dimmable (lighting) load.

FIG. 11H connects logically with each of FIGS. 11C, 11E, and 11G, at step 1124, which is followed by a determination, at step 1206, whether any load(s) under the control of premises power controller 202 remains to be processed. If not, control flow returns to the point at which the method of FIG. 11H was called. If so, control flow advances to step 1208 which is a determination of whether the load under consideration is an HVAC system. If so, control flow advances to step 1220 (FIG. 12A). If not, a determination is made at step 1210 whether the load is dimmable and, if it is, control flow advances to step 1222 (FIG. 13A).

Figure 14:
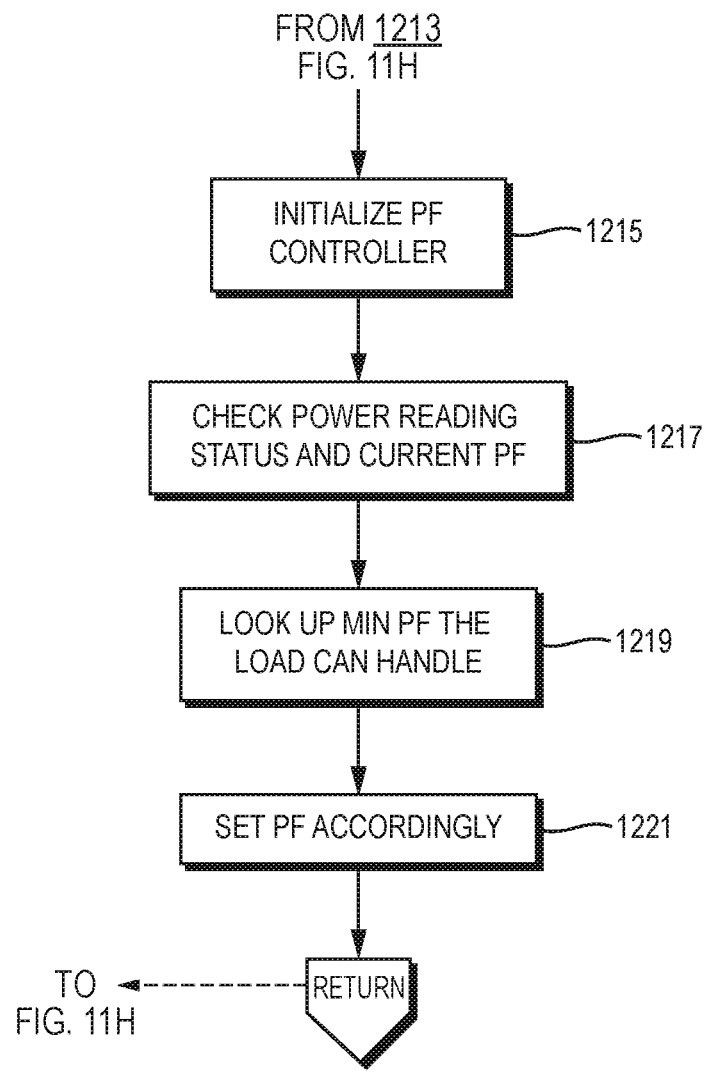
FIG. 14 is a flowchart for a premises power controller managing a power factor controllable load.
Figure 15:
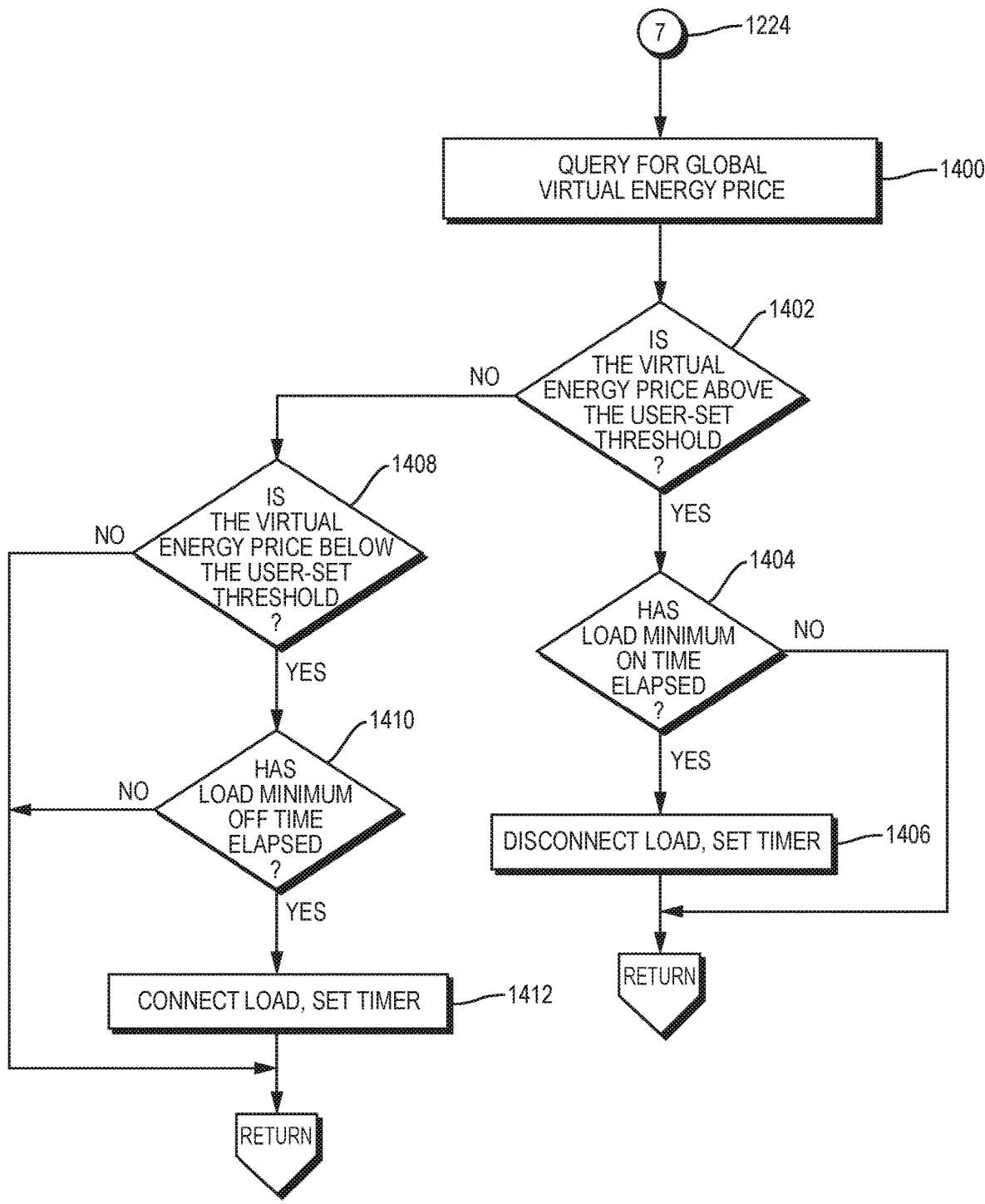
FIG. 15 is a flowchart for a premises power controller managing a non-dimmable load.
Figure 16:
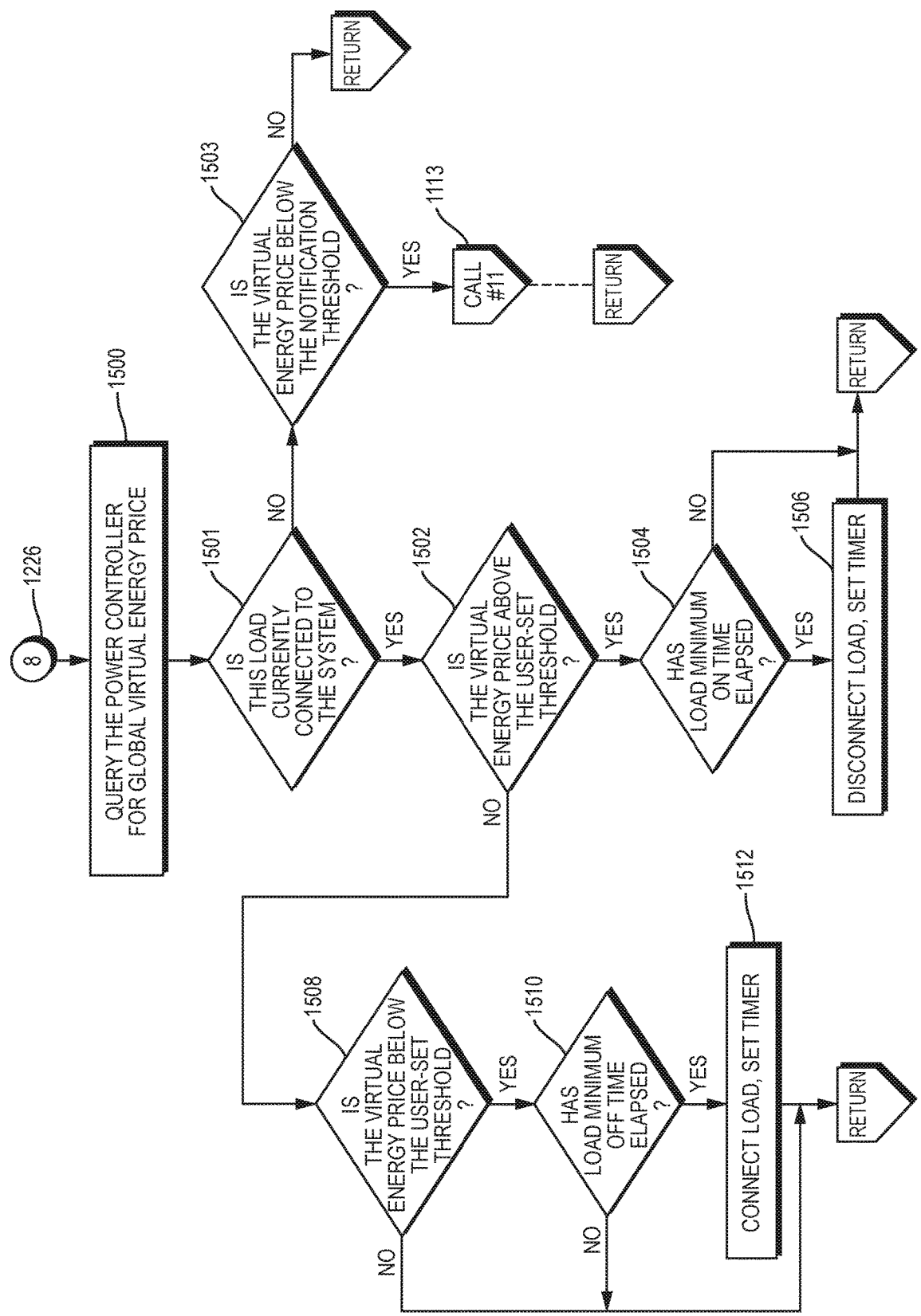
FIG. 16 is a flowchart for a premises power controller managing a diversion load.

If the load is not dimmable, then at step 1211 a determination is made whether the load is of type for which a power factor (PF) may be controlled to reduce the amount of real power absorbed by the load. If so, control flow advances to step 1213 (FIG. 14). If not, control flow advances to step 1212 where a determination is made whether the load is non-dimmable and, if it is, control flow advances to step 1224 (FIG. 15). If not, then at step 1214 a determination is made whether the load is a diversion load and, if it is, control flow advances to step 1226 (FIG. 16). If not, then at step 1216 a determination is made whether the load is an electric vehicle and, if it is, control flow advances to step 1228 (FIG. 17A). At step 1218, the load is determined to be a non-managed load, but whose power consumption may still be measured (e.g., by an intelligent circuit breaker to which the load is connected).

FIG. 12A illustrates a method for a premises power controller to manage an HVAC load. At step 1230, premises power controller 202 measures a zone temperature within the premises. Such a measurement may be made, for example, using a temperature sensor interfaced with premises power controller 202 as discussed above. Next, at step 1232, if it is not already available, a query for a global virtual energy price is made, which may have been calculated through the preceding logic. Using the measured temperature and calculated global virtual energy price, a point is located on the graph of FIG. 12B and, at step 1236, a determination made whether the point is above the cost-temperature curve D of that graph (e.g., the point indicated by reference letter G in FIG. 12B). If so, control flow advances to step 1238 which indicates that energy use is not justified and no action is taken, followed by a return to FIG. 11H (i.e., the HVAC load is not activated).

Figure 12B:
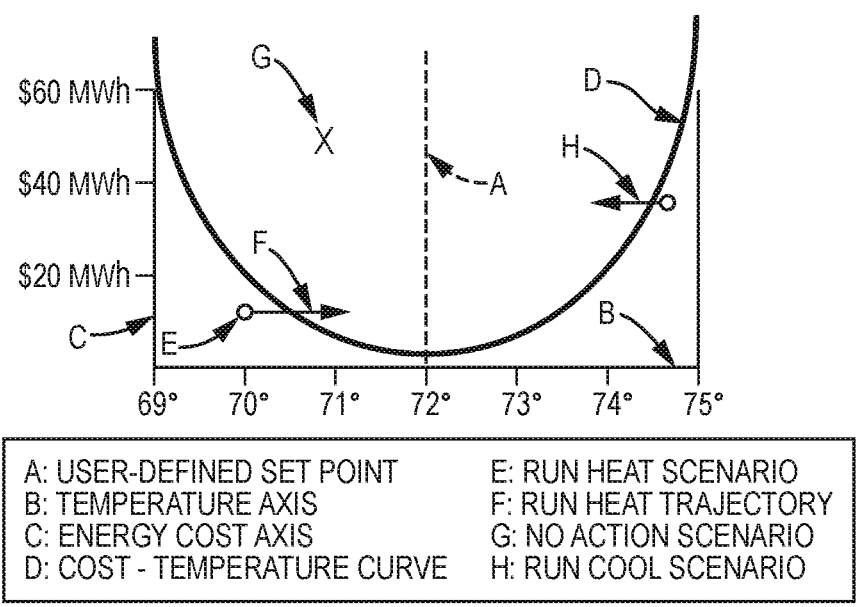
FIG. 12B is a power cost-temperature graph illustrating exemplary points of reference and conditions which are addressed in the flowchart of FIG. 12A.

If, on the other hand, at step 1236 the point is determined to be below the cost-temperature curve D (e.g., either of the points indicated by reference letters E or H in FIG. 12B), the control flow advances to step 1240 at which a determination is made whether the HVAC minimum run time (MRT) will cause the zone temperature to cross a user-defined set point (indicated by reference letter A in FIG. 12B). If so, meaning the minimum run time of the HVAC system will cause the temperature to increase or decrease excessively, control flow returns to FIG. 11H.

If the minimum run time of the HVAC system will not cause the zone temperature to cross the user-defined set point, then at step 1242 a determination is made whether a minimum off time for the HVAC system has elapsed. If not, meaning it is too soon to run the HVAC system again, control flow again returns to FIG. 11H. If so, control flow advances to step 1244 at which premises power controller 202 calculates a trajectory which will move the point of interest above curve D while following any system constraints. An acceptable trajectory will cause the point of interest to remain above curve D for at least the duration of the minimum off time for the HVAC system. This is followed by step 1246 at which HVAC system operation is scheduled for the duration of the trajectory calculated in step 1244.

Figure 13B:
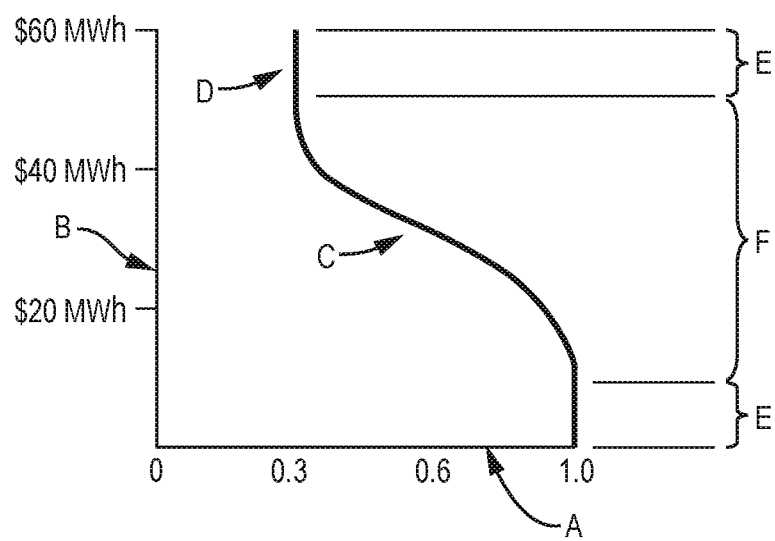
FIG. 13B is a power cost-light intensity graph illustrating exemplary points of reference and conditions which are addressed in the flowchart of FIG. 13A.

FIG. 13A illustrates a method for premises power controller 202 to manage (e.g., is set a power level of) a dimmable (lighting) load. Following step 1222 (from FIG. 11H), control flow advances to step 1300 at which a query is made for a global virtual energy price, as discussed above. Next, at step 1302, premises power controller 202 finds the nearest point(s) on a cost-light intensity curve (indicated by reference letter C in FIG. 13B). This is followed by a determination at step 1304 whether more than one nearest point was returned in step 1302. If not, control flow advances to step 1308 at which the single nearest (scalar) point is subsequently, in step 1310, multiplied with a user-set intensity value yielding a final lighting intensity. Alternatively, at step 1304, if more than one nearest point was returned, then control flow advances to step 1306 at which cubic interpolation is used to resolve a single, interpolated nearest point which is then used in the multiplication of step 1310. Control flow returns to FIG. 11H following step 1310.

FIG. 14 illustrates a method for a premises power controller 202 to manage a load whose power factor (PF) may be controlled so as to reduce the amount of real power consumed by the load. Following step 1213, control flow advances to step 1215 at which premises power controller 202 initializes a power factor controller which, for example, may be represented by the combination of AC-DC converter 410 and DC-AC inverter with power factor control 412 (FIG. 4). Next, at step 1217, premises power controller 202 checks a power reading status and current PF for the load. This is followed, at step 1219, by a lookup to determine a minimum PF that the load can handle. At step 1221, a (reduced PF) is set in accordance with the minimum PF, thereby reducing the amount of real power consumed by the load. Control flow returns to FIG. 11H following step 1221.

FIG. 15 illustrates a method for a premises power controller 202 to manage a non-dimmable load. Following step 1224, control flow advances to step 1400 at which a query for a global virtual energy price is rendered, as discussed above. At step 1402, a determination is made whether the global virtual energy price is above a user-set threshold. If so, control flow advances to step 1404 at which a determination is made whether the minimum on time for the non-dimmable load of interest has elapsed. If so, the non-dimmable load is disconnected (i.e., premises power controller 202 actuates an intelligent circuit breaker connected to that load) and a (minimum off time) timer set at step 1406, followed by a return to FIG. 11E. Alternatively, at step 1404, if the minimum is on time for the non-dimmable load of interest has not yet elapsed, control flow returns to FIG. 11H.

If, at step 1402, the global virtual energy price is not above the user-set threshold, the control flow advances to step 1408 at which a determination is made whether the global virtual energy price is below the user-set threshold. If not, control flow returns to FIG. 11H. If so, control flow advances to step 1410 at which a determination is made whether the non-dimmable load's minimum off time has elapsed. If not, then control flow returns to FIG. 11H. If so, the non-dimmable load is connected and a (minimum on time) timer is set at step 1412, followed by a return to FIG. 11H.

Figure 19:
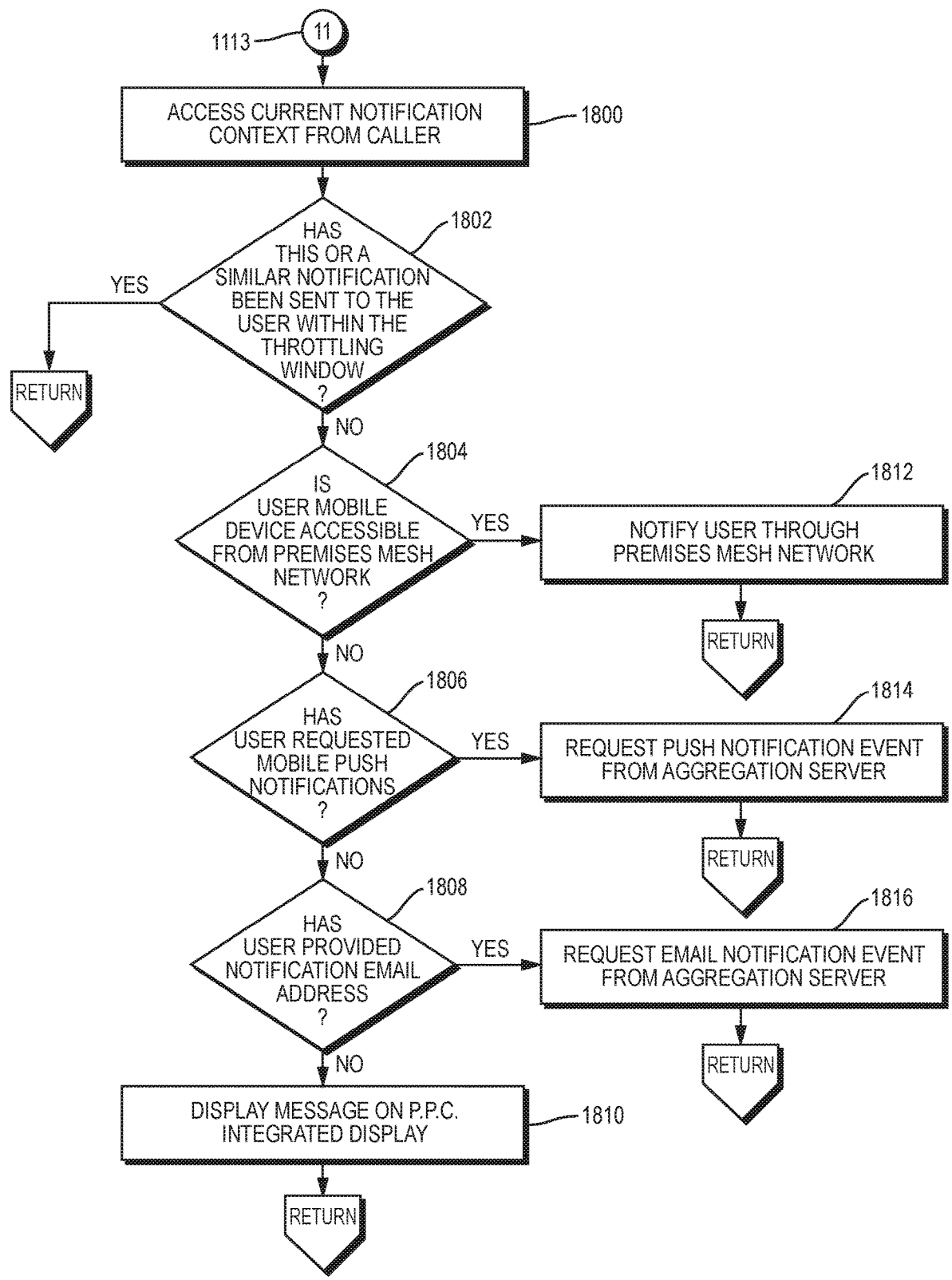
FIG. 19 is a flowchart illustrating examples of user notifications.

FIG. 16 illustrates a method for premises power controller 202 to manage a diversion load. Following step 1226, control flow advances to step 1500 at which a query for a global virtual energy price is made, as discussed above. Next, at step 1501, a determination is made whether the load is currently connected to the system. If not, control flow advances to step 1503 at which a determination is made whether the virtual energy price is below a user notification threshold. If not, control flow returns to FIG. 11E. If so, control flow advances to step 1113 (FIG. 19).

With reference again to step 1501, if the load is determined to be currently connected, control flow advances to step 1502 at which a determination is made whether the virtual energy price is above a user-set threshold. If so, a determination is made at step 1504 whether the diversion load's minimum on time has elapsed. If the minimum on time has not elapsed, control flow returns to FIG. 11H. If the minimum on time has elapsed, the diversion load is disconnected and a (minimum off time) timer is set at step 1506, which is followed by a return to FIG. 11H.

If, at step 1502, the virtual energy price is not above the user-set threshold, control flow advances to step 1508 at which a determination is made whether the virtual energy price is below the user-set threshold. If not, control flow returns to FIG. 11H. If the virtual energy price is below the user-set threshold, control flow advances to step 1510 where a determination is made whether the diversion load's minimum off time has elapsed. If not, control flow returns to FIG. 11H. If so, premises power controller 202 connects the diversion load and sets a (minimum on time) timer at step 1512 before is returning to FIG. 11H.

FIG. 17A illustrates a method for a premises power controller to manage charging of an electric vehicle load. Following step 1228, a determination is made at step 1599 whether the load is correctly connected to the system (i.e., is the electric vehicle correctly connected to its charge controller). If not, control flow advances to step 1601 where a determination is made whether a virtual energy price is below a notification threshold. If not, control flow returns to FIG. 11H. If so, control flow advances to step 1113 (FIG. 19).

Figure 17B:
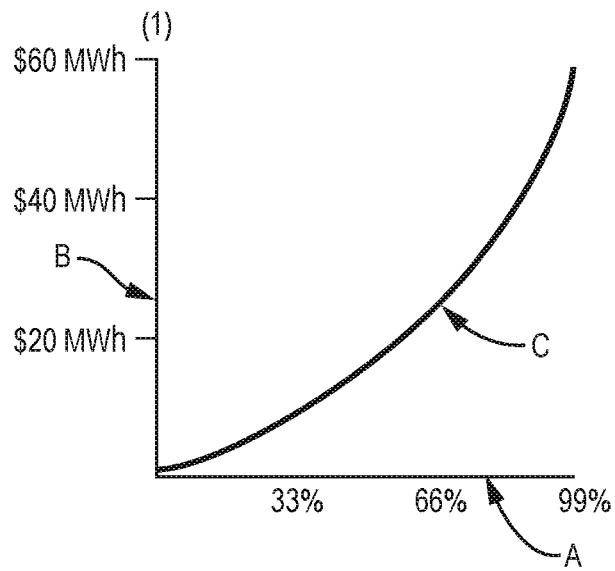
FIG. 17B is a power cost-portion of time to trip required to charge electric vehicle battery graph.
Figure 17C:
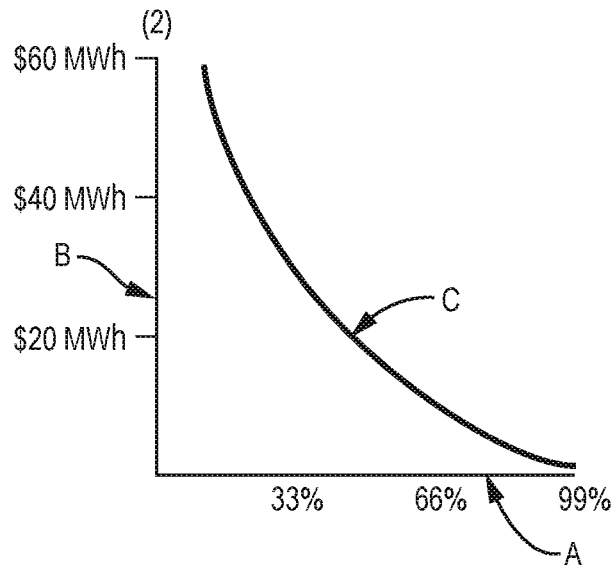
FIG. 17C is a power cost-idle charge level graph.

If, at step 1599, it is determined that the load is correctly connected to the system, then control flow advances to step 1600 for a determination whether a user has requested a charge cycle. If so, control flow advances to step 1610 where the electric vehicle begins charging, followed by a return to FIG. 11H. If not, control flow advances to step 1602 where a determination is made whether a trip is scheduled within the next 24 hours. If no trip is scheduled, control flow advances to step 1606 at which a determination is made whether the global virtual energy price is lower than an idle charge level-cost curve denoted by reference letter C in FIG. 17C. If the global virtual energy price is lower than the idle level-cost curve, control flow again advances to step 1610 to begin charging. If not, control flow advances to step 1608 at which a determination is made whether the electric vehicle battery charge cycle will cover a minimum energy price period as supplied by the public power grid (PPG). If so, control flow again advances to step 1610 to begin charging. If not, control flow returns to FIG. 11H. If, at step 1602, it is determined that a trip is scheduled within the next 24 hours, control flow advances to step 1604 at which a determination is made whether the global virtual energy price is lower than a charge desperation-cost curve, denoted by reference letter C in FIG. 17B, for the time to trip. If so, control flow again advances to step 1610 to begin charging. If not, control flow advances to step 1606 as described above.

Figure 18A:
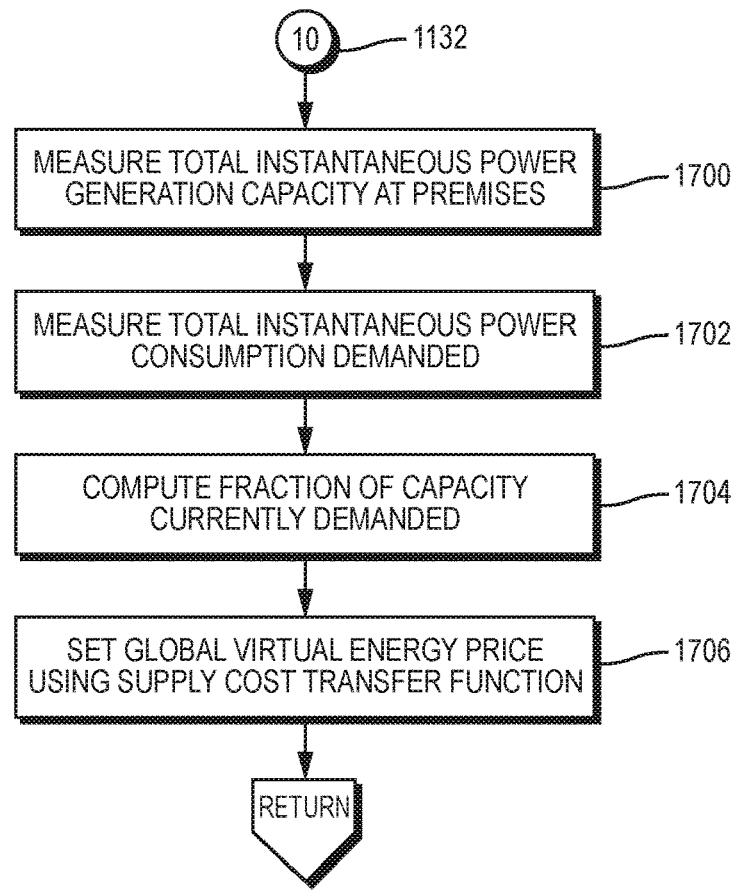
FIG. 18A is a flowchart for a premises power controller calculating a virtual energy price.
Figure 18B:
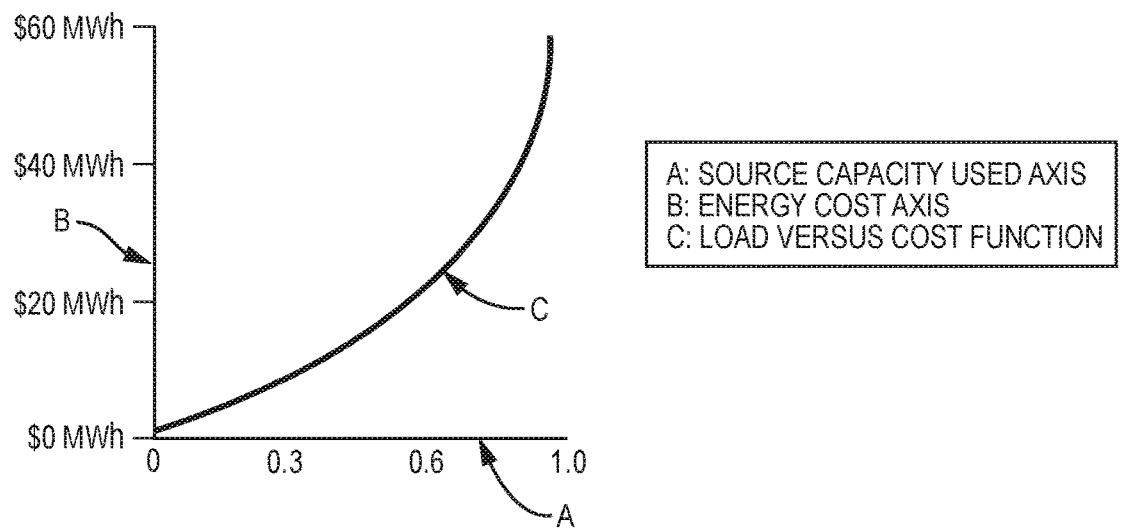
FIG. 18B is a graph illustrating an exemplary supply cost transfer function referenced in FIG. 18A.

FIG. 18A illustrates a method for calculating a global virtual energy price for a given premises. At step 1700, a measurement is made of total instantaneous power generation capacity of the premises. That is, a measurement is made of total energy generated by the premises, including renewable sources and non-renewable generators, and available for use. Next, at step 1702, a measurement is made of the total instantaneous energy demands within the premises by managed and unmanaged loads. Control flow then advances to step 1704 where a computation is made of the fraction of total instantaneous power generation capacity currently demanded by the premises. Next, at step 1706, a global virtual energy price is set using a supply cost transfer function denoted by reference letter C in FIG. 18B. That is, the computed fraction of total instantaneous power generation capacity is located along the horizontal axis of FIG. 18B, which in turn is used to locate a corresponding point (on transfer function C) whose ordinate is the global virtual energy price.

FIG. 19 illustrates a method of issuing user notifications regarding a given premises. Following step 1113, control flow advances to step 1800 at which premises power controller 202 accesses a current notification context from a caller. Next, at step 1802, a determination is made whether this or a similar notification was previously sent to the user within a throttling window. If so, control flow returns to the previous point at which this method was invoked. If not, control flow advances to step 1804 at which a determination is made whether a user mobile device is accessible from a premises mesh network. If so, control flow advances to step 1812 at which a notification is sent to the user's mobile phone over the premises mesh network, followed by a return.

If, at step 1804, the user's mobile phone is not accessible, then control flow advances to step 1806 in which a determination is made whether a user requested mobile push notifications. If so, control flow advances to step 1814 at which a request for a push notification event is sent to aggregation server 112. If not, control flow advances to step 1808 at which a determination is made the user has provided an email address at which to receive notifications. If so, control flow advances to step 1816 at which a request for an email notification event is sent to aggregation server 112, followed by step 1810 at which a message is displayed on display 526 (FIG. 5) of premises power controller 202, followed by a return.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A system comprising:
a power controller coupled to a circuit breaker panel of a premises configured to receive electrical power from a power grid of a utility or an electrical vehicle (EV) battery;
a component adapted to fit in the circuit breaker panel, the component having a wireless transceiver and configured to control the electrical power to a branch circuit having a critical load at the premises when powered from the power grid, wherein the power controller communicates wirelessly with the component to effect actuation; and
the power controller configured to, in response to a power down of the power grid to the circuit breaker panel, dynamically manage the electrical power via a mobile device using the component to control the electrical power to the branch circuit having the critical load powered from the EV battery, wherein the branch circuit need not be wired to a dedicated circuit breaker panel.

2. The system of claim 1, wherein the critical load is an EV charge controller.

3. The system of claim 1, wherein the power controller is further configured to provide a power management notification to a mobile phone of a user.

4. The system of claim 1, wherein the mobile device is a smartphone of a user.

5. The system of claim 1, wherein the EV battery is coupled to an inverter configured to supply the electrical power to the component.

6. The system of claim 1, wherein the critical load is prioritized according to one or more of class or load specifications.

7. The system of claim 1, wherein the critical load is prioritized according to geographic location.

8. The system of claim 1, wherein the dynamic management of the electrical power is in accordance with a plurality of predetermined power management scenarios.

9. The system of claim 1, wherein the component includes a transistor.

10. The system of claim 1, further comprising a wireless network module connected to the power controller and communicating with a server over a wide-area-network.

11. A system comprising:
a power controller coupled to a circuit breaker panel configured to receive power from an electrical vehicle (EV) battery charged via a power-generating source at a premises;
a component adapted to fit in the circuit breaker panel, the component having a wireless transceiver and configured to control the power to a branch circuit having an electrical load at the premises, wherein the power controller communicates wirelessly with the component to effect actuation; and
the power controller configured to, in response to a lower cost of energy stored in the EV battery than a power grid of a utility, provide the power to the electrical load from the EV battery managed via a smartphone using the component to control the power to the branch circuit having the electrical load, wherein the electrical load need not be wired to a dedicated circuit breaker panel.

12. The system of claim 11, wherein the power-generating source is a solar panel.

13. The system of claim 11, wherein the electrical load is prioritized according to one or more of class or load specifications.

14. The system of claim 11, wherein the electrical load is an electrical appliance.

15. The system of claim 11, wherein the management of the power is in accordance with a plurality of predetermined power management scenarios.

16. The system of claim 11, wherein the component includes a relay.

17. The system of claim 11, further comprising a wireless network module connected to the power controller and communicating with a server over a wide-area-network.

18. The system of claim 11, wherein a power management scenario is selected via an operation on the smartphone.

19. The system of claim 11, wherein status information of the electrical load is obtained and displayed via an operation on the smartphone.

20. A system comprising:
a power controller coupled to a circuit breaker panel configured to receive electrical power from a power grid of a utility or a renewable power-generating source of a premises;
a component adapted to fit in the circuit breaker panel, the component having a wireless transceiver and a switch configured to control the electrical power to a branch circuit having an electrical load at the premises, wherein the power controller communicates wirelessly with the switch to effect actuation; and
the power controller configured to, in response to a power down of the power grid to the circuit breaker panel, manage the electrical power via a mobile device using the component to control the electrical power to the branch circuit from the renewable power-generating source, wherein the electrical load need not be wired to a dedicated circuit breaker panel.

* * * * *